(12) United States Patent
Lu et al.

(10) Patent No.: US 7,454,233 B2
(45) Date of Patent: Nov. 18, 2008

(54) COMMUNICATIONS OF UICC IN MOBILE DEVICES USING INTERNET PROTOCOLS

(75) Inventors: HongQian Karen Lu, Austin, TX (US); Binh Hoa Nguyen, Austin, TX (US)

(73) Assignee: Gemalto Inc, Austin, TX (US)

( * ) Notice: Subject to any disclaimer, the term of this patent is extended or adjusted under 35 U.S.C. 154(b) by 482 days.

(21) Appl. No.: 11/234,577

(22) Filed: Sep. 23, 2005

(65) Prior Publication Data

US 2006/0079284 A1    Apr. 13, 2006

Related U.S. Application Data

(60) Provisional application No. 60/612,768, filed on Sep. 23, 2004.

(51) Int. Cl.
*H04B 1/38* (2006.01)

(52) U.S. Cl. ...................... 455/558; 455/407
(58) Field of Classification Search .......... 455/558, 455/407
See application file for complete search history.

(56) References Cited

U.S. PATENT DOCUMENTS 6,011,976 A * 1/2000 Michaels et al. ............ 455/466

OTHER PUBLICATIONS

Guthery et al., "The WebSIM—Clever Smartcards Listen to Port 80", 1999.*
Guthery et al., "The WebSIM—Clever Smartcards Listen to Port 80", 1999.*

* cited by examiner

*Primary Examiner*—Lester Kincaid
*Assistant Examiner*—Steven Lim
(74) *Attorney, Agent, or Firm*—Pehr Jansson; The Jansson Firm

(57) ABSTRACT

A mobile device and UICC communication using standard Internet protocols. Such communication allows users access to their UICC information using standard web browsers and allows use of the UICCs to communicate with remote servers and thereby provide secure services for Internet transactions. The mobile device has a communications module to selectively communicate with the UICC processor or with at least one node on a network, the mobile device communications module has an Internet protocol module operable to receive messages issued from a first Internet application as Internet protocol packets, and to transmit the packets to target IP addresses; and operable to receive Internet protocol packets, to process the packets, and to send the messages contained in the packets to the first Internet application.

30 Claims, 13 Drawing Sheets

COMMUNICATIONS OF UICC IN MOBILE DEVICES USING INTERNET PROTOCOLS

CROSS-REFERENCE TO RELATED APPLICATIONS

This patent application is a non-provisional patent application claiming priority from provisional patent application Ser. No. 60/612,768, filed on Sep. 23, 2004, entitled "Communications of UICC in Mobile Devices Using Internet Protocols," the teachings of which are incorporated by reference herein as if reproduced in full below.

TECHNICAL FIELD OF THE INVENTION

The present invention relates generally to mobile device communication and more particularly to communication with a UICC (Universal Integrated Circuit Card).

BACKGROUND OF THE INVENTION

One of the principal standards for mobile communication is the Global System for Mobile Communication (GSM). A central feature of the GSM standard is the Subscriber Identity Module (SIM) or SIM Card. The SIM card is an integrated circuit card that contains a user's subscription information and phonebook. A SIM card is a small microprocessor card inserted into a mobile device, such as a cell phone or a PDA. The chip size of the SIM card is no more than 25 mm$^2$. The SIM card is portable, secure, and tamper resistant. The SIM card is a critical module in a cell phone (often called a handset) of GSM networks and other current and future cellular networks. A user cannot even turn on a cell phone that does not contain a SIM card. The SIM card enables the user to be authenticated to the cellular network, to be associated with an account with the telecom operator, and to be authorized to use the network's voice, data and other services. The SIM card stores certificates and keys for authentication purposes and stores other personal information for various applications. The owner of the SIM card can access the SIM card via applications in the handset. For example, the phone book application can access the phone book stored in the SIM card.

While SIM cards provide many critical functions in their use in GSM handsets, there are several important deficiencies in the communication between a user and a SIM card. Because integrated circuit cards, including SIM cards, lack input and output devices, integrated circuit cards rely on some external means for communication with users and other computers. With respect to SIM cards that interaction has several deficiencies. First, SIM cards communicate with outside networks through the mobile device that the SIM resides in. Until recently, there is no mechanism to create a direct, reliable, and secure communication channel between a SIM card and a remote server. Second, not all mobile devices have the same methods for users to invoke the same or similar SIM applications. For example, different devices provide different ways to access their respective phone books. To improve the user experience, telecom operators have requested web servers on SIM cards and the ability to access the SIM cards via web browsers in the handsets. This has become one of the tasks addressed by the GSM Association's Smart Card Group (SCaG). Third, SIM application programs that communicate with the SIM card must be written and loaded to the handset. The embedded software development is a nontrivial process.

Because SIM cards, hitherto, have had to rely on the handset to act as a proxy for any communication with the user or with other network nodes, reliable end-to-end communication between the SIM cards and users or other network nodes has not been possible.

The prior art does not show a mechanism by which a SIM module can communicate with the outside world using standard Internet protocols thus enabling users to access their SIM cards as network nodes, for example using a web browser on the handset.

There have been several attempts to provide some level of Internet capability to SIM cards. WebSIM (described in Guthery, S., Kehr, R., and Posegga, J., "How to Turn a GSM SIM into a Web Server," http://www.eurescom.de/~public-webspace/P1000-series/P1005/websim/websim_cardis.pdf and in Eurescom P1005 project, http://www.eurescom.de/~public-webspace/P1000-series/P1005/websim/websim_info.htm) is a solution to integrate a web server onto a SIM card. With WebSIM, any network node on the Internet is able to access the web server using the phone number of the mobile device that holds the SIM card. The approach consists of a web proxy that intercepts HTTP requests from a web client and encapsulates the HTTP requests into SMS messages to send to the mobile phone over the mobile networks. The web server in the SIM card registers itself with the SIM manager to intercept the SMS messages that contain the HTTP requests. The web server extracts and serves the HTTP requests encapsulated in the SMS messages, and then encapsulates the HTTP responses into SMS messages to send back to the web proxy that then sends the HTTP responses to the web client. At the current stage, the web proxy is also connected to a mobile phone through which the SMS messages are exchanged with the web server on the SIM card of another mobile phone. WebSIM was implemented with the Java SIM card.

Microsoft Corporation of Redmond, Wash., announced in 2001 an implementation of a web server called WebCamSIM for SIM cards running the Microsoft operating system. WebCamSIM is described in "Microsoft puts Web server on a phone", http://news.com.com/2100-1033-255352.html?legacy=cnet. Like WebSIM, WebCamSIM uses an SMS gateway to translate HTTP requests and responses into SMS messages, which are then sent to the mobile device that holds the WebCamSIM card.

These techniques for providing a web server on a SIM card rely on intermediate software, the SMS gateway or proxy, on the handset and therefore do not provide end-to-end secure communication between the web server on the SIM card and other Internet nodes. Furthermore, the reliance on SMS messages, which are limited to a maximum length of 160 bytes, may provide poor performance.

From the foregoing it is apparent that there is a need for improved communication between integrated circuit cards used as SIM cards and associated handsets. In particular, such improved communication methods should provide mechanisms for communication using generally available communications protocols thereby providing increased flexibility in the access of SIM cards and information stored thereon, and reliable and secure end-to-end communication between SIM cards and remote Internet nodes.

SUMMARY OF THE INVENTION

In a preferred embodiment, the invention provides a system and method by which a Universal Integrated Circuit Card (UICC) and a host mobile device, to which the UICC is connected, may communicate using standard network protocols such as PPP and TCP/IP. Using the communication techniques provided by the invention, a user of the host mobile device may access information on the UICC using a standard web browser running on the mobile device. In a further advantage provided by the invention, using the communications methods of the invention, a UICC located in a host mobile device may engage in direct communication with a remote Internet server using standard networking communications protocols.

A system for communication between a mobile device has a mobile device communications module stored in the mobile device memory and instructions to cause the mobile device processor to selectively communicate with a UICC processor or with at least one node on a network, the mobile device communications module having an Internet protocol module operable to receive messages issued from a first Internet application, e.g., a web browser running on the mobile device, to package the messages as Internet protocol packets, and to transmit the packets to target IP addresses; and operable to receive Internet protocol packets from the UICC, to process these packets, and to send the messages contained in the packets to the first Internet application. To determine whether a particular data item should go to the UICC or to the network, the mobile device has a routing module operable to receive Internet protocol packets and operable to cause the internet protocol module to transmit the packets selectively to the mobile device, to a GPRS network or to the UICC as a function of the target Internet protocol address of the packets.

Each of the UICC and the mobile device include communication modules implementations of a communications stack that include Internet level protocols and Link Layer Protocols, the latter supporting communication between the UICC and the mobile device using Internet level protocols over a data link on which data is transmitted according to the protocol used for communication between a UICC and a mobile device. The Link Layer Protocols, and their corresponding implementations on the UICC and the mobile device, include an intermediate link layer for bridging between the higher level link layer protocols, e.g., PPP, and the protocol for communication between a UICC and a mobile device, e.g., ISO 7816.

In one aspect of the invention, a mobile device may provide a mechanism by which a web browser on the mobile device or on an external computer to which the mobile device is connected may be used to access the UICC connected to the mobile device using standard Internet communications protocols.

In another aspect of the invention, the sophisticated Internet communications capabilities provided by the network UICC according to the invention and the associated mobile device provide the possibility of the UICC having direct communication with a remote web server, thereby allowing the UICC to be used with many Internet based transactions.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
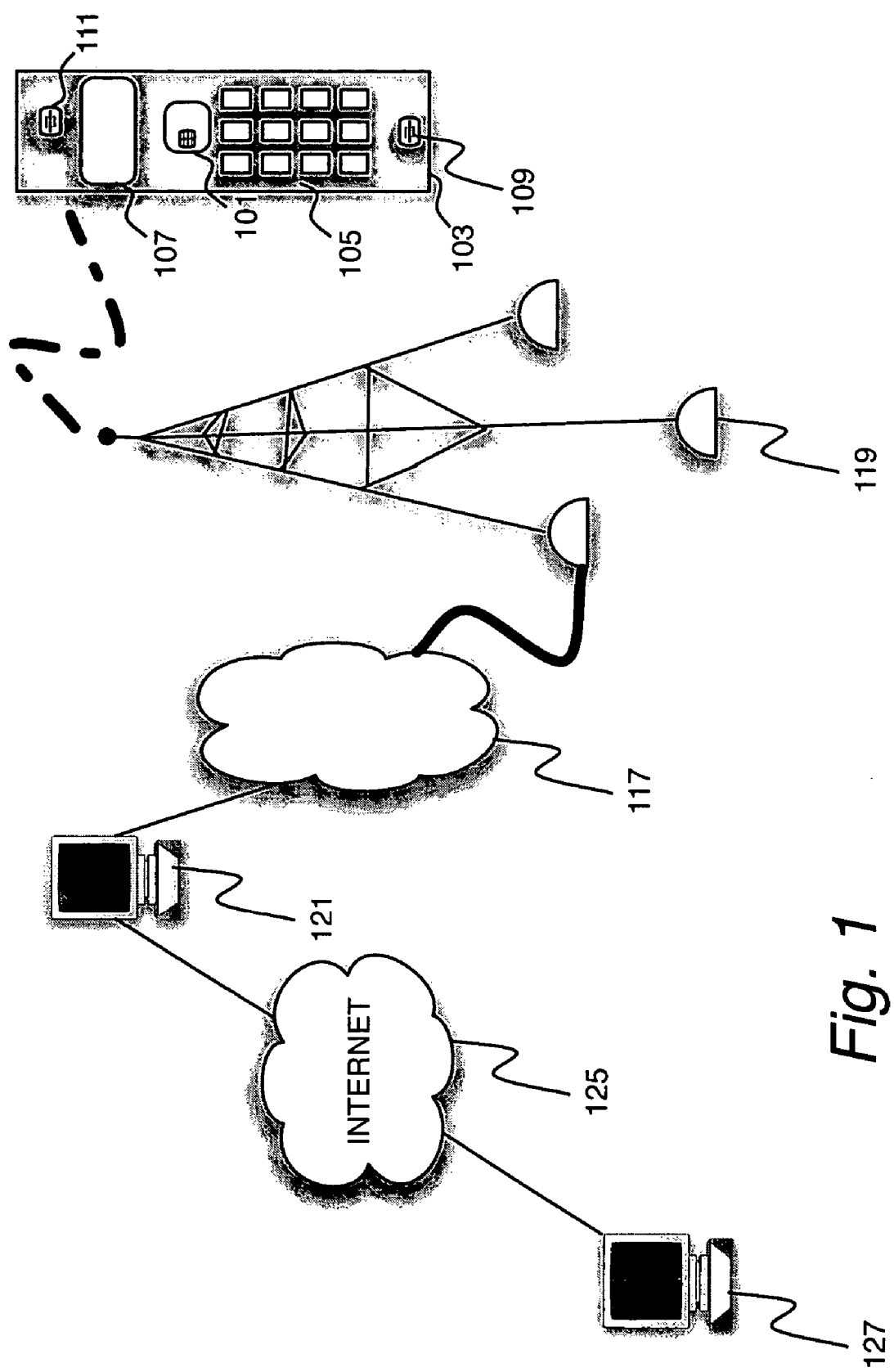
FIG. 1 is a schematic illustration of the operating environment in which a UICC according to the invention may be used to provide reliable communication with a remote entity.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

1.0 Introduction

As shown in the drawings for purposes of illustration, the invention is embodied in a novel integrated circuit card and mobile terminal, e.g., Universal Integrated Circuit Cards and the handsets to which the UICCs are inserted, and software for such cards and handsets for allowing a UICC to communicate with other nodes on the network, including the handset, using standard Internet communications protocols. A system and method according to the invention provides users the ability to communication with their SIM cards as a network node, for example, by using a web browser on the handset.

Furthermore, the mechanisms according to the invention provide for reliable and secure end-to-end connections between the UICCs and any remote Internet services and secure Internet online transactions for mobile commerce using mobile handsets.

A brief note on the nomenclature used herein: one aspect of the invention is a Universal Integrated Circuit Card for use in mobile communication devices. One type of such a card is the SIM module integrated circuit card used in GSM handsets. Initially, only GSM handsets carried SIMs in order to access GSM networks. Since their initial adoption in GSM, many other mobile phones for other networks have SIMs as well. Furthermore, SIMs are also used in TV set-top boxes and PDAs. The SIMs for 3G networks, such as UMTS, are called (U)SIMs (Universal SIM). (U)SIMs are secure devices. Their primary purposes are authentication, authorization, and accounting. (U)SIMs also provide other services such as generation of session keys for encryption, data encryption and decryption, and secure storage for personal information. (U)SIMs protect identity of users in that the identity is stored in the smart card, the (U)SIM, and, hence, is physically separated from the handset. This separation provides security and portability. A (U)SIM card is also called the Universal Integrated Circuit Card (UICC). Technically the distinction is that the UICC is the physical device, whereas SIM or (U)SIM are applications running in the UICC. Herein, "UICC" refers to an integrated circuit card for use in mobile communications devices. Thus, a UICC can be a SIM card, a (U)SIM card or other integrated circuit cards used for similar purposes in mobile communications devices.

This invention pertains both to UICCs and to the mobile devices that make use of UICCs. For the sake of fluidity of the prose used herein, the term "handset" shall be interpreted as any mobile communications device, e.g., a mobile telephone or a personal digital assistant, or even a television set-top box, that uses an integrated circuit card to contain user information or applications in a manner similar to the use of SIM card in a GSM telephone handset.

2.0 Design Overview

FIG. 1 is a schematic illustration of the operating environment in which a UICC device according to the invention may be used to provide reliable communication with a remote entity. A UICC 101 is installed into a handset 103. The handset 103 may be a mobile telephone having the usual accoutrements of a mobile telephone such as a keypad 105, a display 107, a microphone 109 and a speaker 111. In alternative embodiments, the handset 103 may be a personal digital assistant or any other mobile device using a SIM card. The handset 103 also contains an electronic circuitry (not shown) including a central processing unit and memory. Furthermore, there are a variety of smart mobile devices available, such as web-enabled phones, smart phones, PDAs, handheld PCs and tablet PCs. Many of the smart phones and PDAs combine the cell phone and PDA functionalities. Popular operating systems for smart mobile devices include Symbian, Palm OS, and Microsoft Smartphone. The invention described herein is applicable to such devices if they have a UICC 101.

The electronic circuitry 113 provides communications functionality for the handset 103 with a wireless network 117 via a wireless link to a wireless telephony antenna 119. And the microprocessor provides some of the control functionality of the handset 103, such as managing operations of the handset 103 and managing communications protocols used to communicate with the wireless network 117. The UICC 101 is connected to the electronic circuitry 113 so as to allow communication between the UICC 101 and the handset 103.

The wireless network 117 is composed of a complex communications infrastructure for providing connections to other stations, for example, other mobile stations or land-based telephone systems. One such station may be an Internet gateway 121, which gives the wireless network 117 access to the Internet. As commonly known, very many computers are connected via the Internet. In the scenario presented herein, a user of a handset, e.g., a mobile telephone or a PDA, uses the infrastructure illustrated in FIG. 1 to communicate with the UICC 101 either via the handset 103 or some other computer connected to the Internet 125. Some aspect of this communication uses direct communication between the UICC 101 and the remote entity 127, for example, for the purpose of communicating some information that is stored on the UICC 101 to the remote entity 127.

In one embodiment of the invention a UICC 101 is a network smart card. A network smart card is a smart card that is capable to act as an autonomous Internet node. Network smart cards are described in co-pending patent application Ser. No. 10/848,738 "SECURE NETWORKING USING A RESOURCE-CONSTRAINED DEVICE", filed on May 19, 2004, the entire disclosure of which is incorporated herein by reference. A network smart card has Internet protocols (TCP/IP) and security protocols (SSL/TLS) built into the card. The network smart card can establish and maintain secure Internet connections with other Internet nodes. The network smart card does not depend on a proxy on the host to enable Internet communications. More over, the network smart card does not require local or remote Internet clients or servers to be modified in order to communicate with the smart card.

Like other smart cards, the user information is stored in the network smart card. The smart card only gives out information to the trusted client or server at the user's authorization. The network smart card can be used to secure Internet online transactions and to provide other Internet applications, such as a web server.

Figure 2:
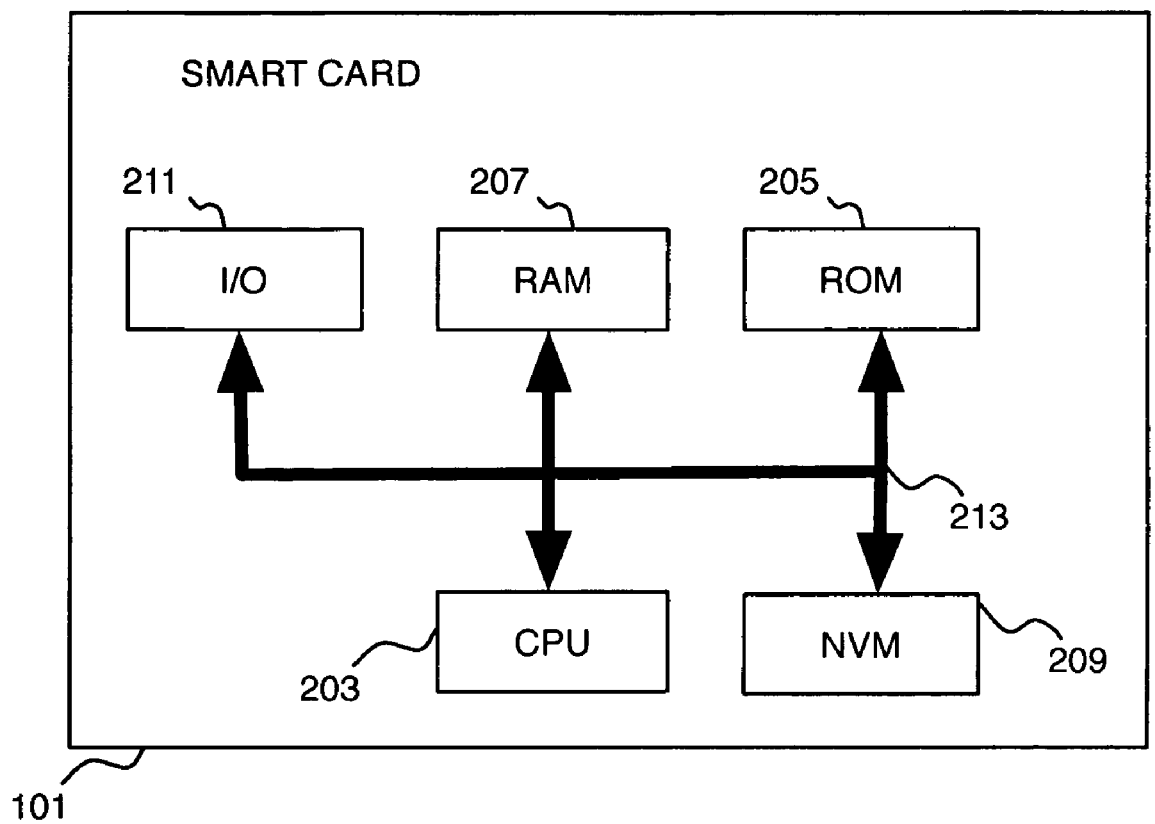
FIG. 2 is a schematic illustration of an exemplary architecture of the hardware of a UICC of FIG. 1 that may be used in conjunction with the invention.

FIG. 2 is a schematic illustration of an exemplary architecture of the hardware of a UICC 101 that may be used in conjunction with the invention. The UICC 101 is a smart card having a central processing unit 203, a read-only memory (ROM) 205, a random access memory (RAM) 207, a non-volatile memory (NVM) 209, and a communications interface 211 for receiving input and placing output to a mobile station 103, particularly the electronics 113 of the mobile station 103, to which the UICC device 101 is connected. These various components are connected to one another, for example, by bus 213. In one embodiment of the invention, the communications module 405 (introduced in FIG. 3 below and described herein below in conjunction with FIG. 3 and other figures herein), as well as other software modules described herein below, would be stored on the resource-constrained device 101 in the ROM 205. In alternative embodiments, the software modules stored in ROM 205 would be stored in a flash memory or other types of non-volatile memory. For purposes of illustration, the invention is described using the ROM example. However, that should not be construed as a limitation on the scope of the invention and wherever ROM is used, flash memory and other types of non-volatile memory can be substituted as an alternative.

The ROM 205 would also contain some type of operating system, e.g., a Java Virtual Machine. Alternatively, the communications module 405 would be part of the operating system. During operation, the CPU 203 operates according to instructions in the various software modules stored in the ROM 205.

Thus, according to the invention the CPU 203 operates according to the instructions in the communications module 405 to perform the various operations of the communications module 405 described herein below.

3. Network Connection Between Network SIM and Mobile Device

In one aspect, the invention is a network smart card with SIM functionality, referred to herein as network SIM card or a network UICC. A network connection may be established between a network UICC and a mobile device to which the network UICC has been inserted. With such a network connection, one can access the network UICC by using a web browser on the mobile device. This connection also enables outside network connection for the network UICC through the mobile device that connects to outside network via various physical links, such as USB, GPRS, 3G, WiFi, Bluetooth, and Infrared.

Figure 3:
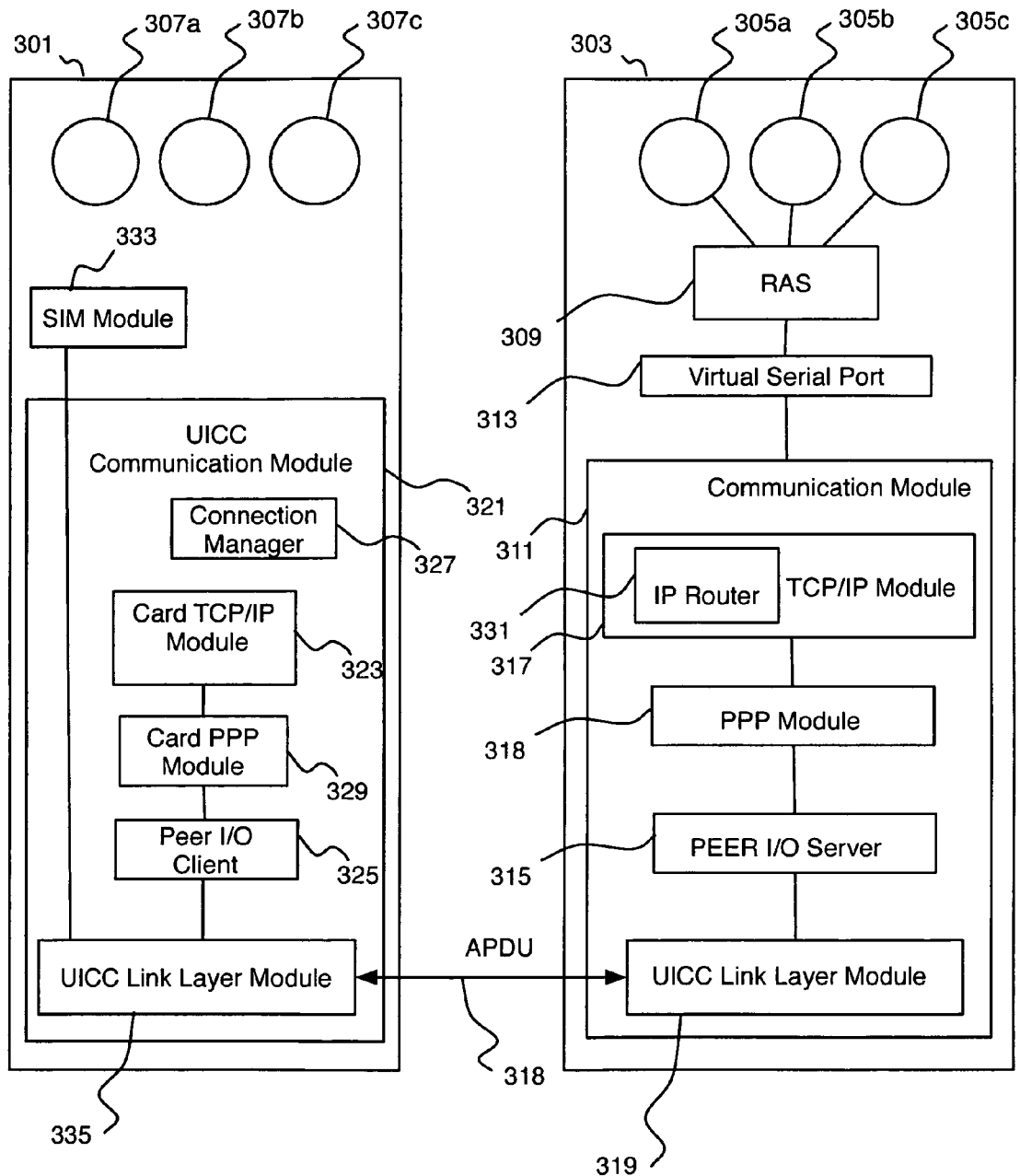
FIG. 3 is a schematic illustration of the software architecture for a network UICC and a mobile device as may be used in conjunction with the invention.

FIG. 3 is a schematic illustration of the software architecture for a network UICC 301 and a handset 303. In the context of FIGS. 1 and 2, the network UICC 301 may be the SIM card 101 and the handset 303 may be the handset 103.

The handset 303 has loaded thereon several network applications 305a, 305b, and 305c. (Note: The handset 303 physical architecture is much like that of a computer. Thus, the handset 303 has a memory and a processor. The memory may be composed of RAM, ROM, EEPROM, etc. The memory contains the software modules that control the behavior of the processor. Thus, the various software modules illustrated in FIG. 3 as being part of handset 303 are usually stored in some non-volatile memory of the mobile device and loaded into the RAM while being executed. From there the software module instructions control the behavior of the processor and causes the mobile device to do certain things, e.g., establish network connections.) Examples of such applications include web browser, and network contacts list application. In the case of a web browser, an application 305a may be used to access the network UICC 301, or more accurately, communicate with a web server executing on the network UICC 301, e.g., SIM card network application 307a.

Figure 7:
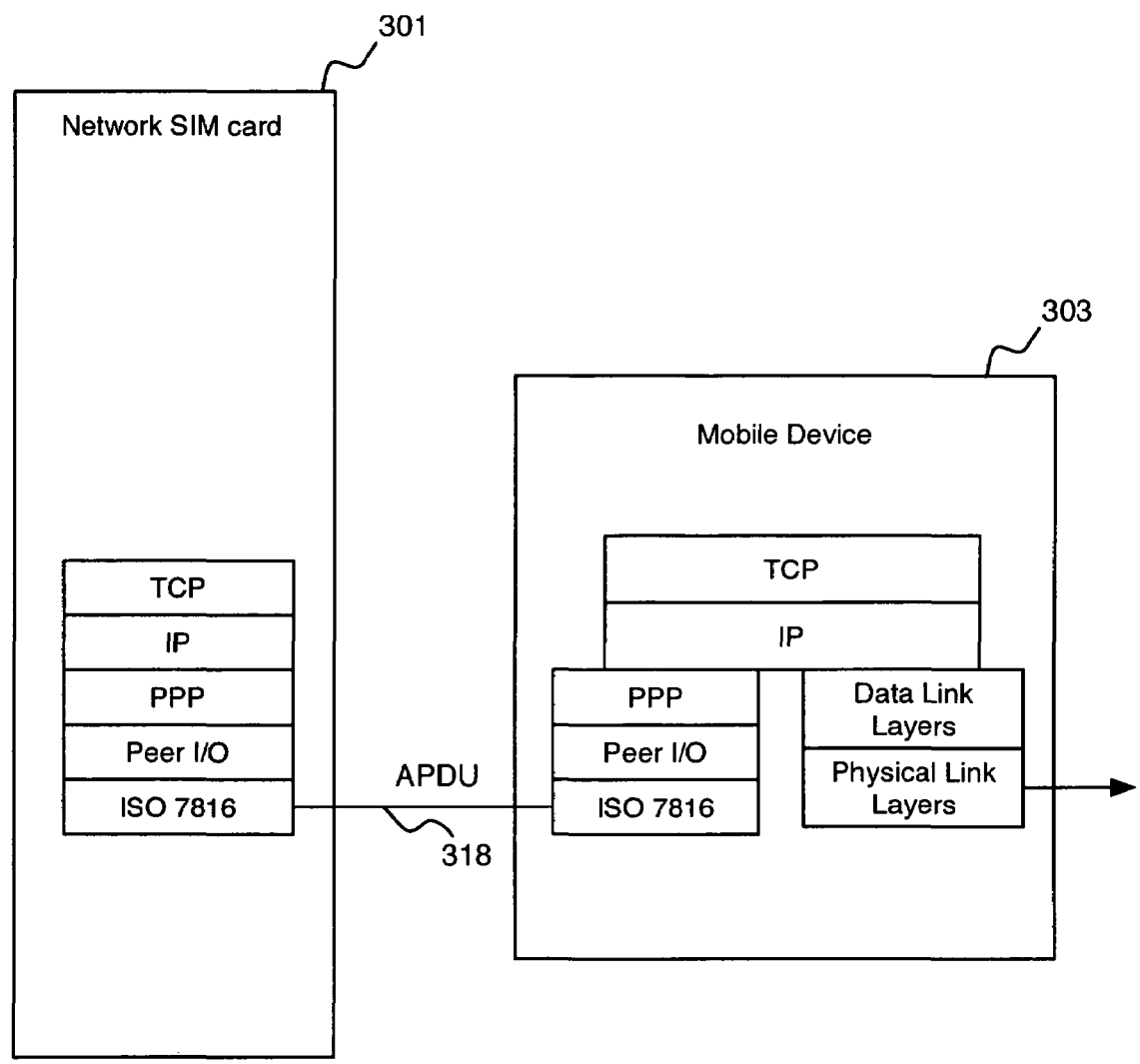
FIG. 7 is a block diagram illustration of the communications stacks implemented on the mobile device and the network UICC of FIG. 3.

The handset 303 and the network UICC 301 communicate over several layers of communication protocols. In one embodiment, these layers may be represented by several communicating software modules, e.g., a TCP/IP Module 317 for handling communications at the TCP/IP level, a PPP module 318 for handling communications at the PPP level, and lower level link layer modules such as a Peer I/O server 315, the role of which is described in greater detail herein below, and a module 319 for communicating according to the standard for communication with smart cards, e.g., according to ISO 7816 APDU. FIG. 7 is a block diagram illustration of the communications stacks implemented on the handset 303 and the network UICC 301. The network UICC 301 and the handset 303 have similar protocol stacks in order to communicate with each other. At the lowest level, the network UICC 301 and the mobile device communicate according to smart card standard ISO 7816. As discussed in greater detail herein below, to enable the half-duplex command/response protocol ISO 7816 to handle full-duplex peer-to-peer Internet protocols, the Peer I/O protocol is layered on top of ISO 7816. The handset 303 uses RAS to connect to the network UICC 301, which enables the use of PPP to carry Internet protocols, such as TCP/IP. The handset 303 may have more than one physical link layer and, hence, more than one data link layer, to connect to the outside network, such as GPRS, Bluetooth, WiFi, and USB. Such outside network links make it possible for the network UICC 301 to connect to another Internet node, such as a remote server over the Internet.

Returning now to FIG. 3, the handset 303 uses a remote access server (RAS) 309 to establish connection with the outside data network. The application programs on the mobile device uses RAS function calls to establish connections to outside network. Furthermore, the application programs on the mobile device 309 use function calls to the RAS 309 to establish a network connection with the network UICC 301. The RAS 309 communicates with other nodes on the network via a communications module 311. The RAS 309 communicates through a virtual serial port interface 313 using PPP protocol thereby allowing the RAS module 309 to communicate with the communications module 311 as if the latter were a serial driver. After a PPP connection has been established, through further RAS function calls, PPP frames carry, or encapsulate, TCP/IP packets. The virtual serial port 313 maps serial communication from the RAS into Internet communications protocols, e.g., TCP/IP and PPP, and lower level protocols, expected by the communications module 311. The physical connection 318 and lower data link layer 319 connection between network UICC 301 and the handset 303 are smart card standard ISO 7816. To bridge between the RAS module 309 and the ISO 7816 module, i.e., broadly, the UICC Link Layer Module 319, the communications module 311 includes a Peer I/O server 315 and a virtual serial port 313. The Peer I/O server 315 implements the Peer I/O server finite state machine. Peer I/O, including the Peer I/O server finite state machine, is described in greater detail in hereinabove referenced co-pending patent application Ser. No. 10/848,738 entitled "SECURE NETWORKING USING A RESOURCE-CONSTRAINED DEVICE", filed May 19, 2004, which is incorporated herein by reference. The virtual serial port 313 implements the serial port interface that is defined by the operating system of the handset 303. The RAS connection is established through this virtual serial port 313.

Data communication between the handset 303 and the network UICC 301 relies on the ISO 7816 communications protocol. This standard specifies a half-duplex serial interface, which, therefore, is not compatible with Internet protocols, such as TCP/IP/PPP, which are full-duplex communication protocols. RAS, on the other hand, communicates with another device through a full duplex serial port, for example a COM port when using Microsoft OS.

In addition to the full duplex vs. half-duplex problem, another issue is due to that Internet protocols are peer-to-peer, meaning that the node at either end of the link can initiate communication. On the other hand, ISO 7816 specifies command/response operation wherein the smart card only responds to commands issued by the terminal.

In a preferred embodiment of the invention, to solve these two problems, the communication module 311 contains an implementation of the Peer I/O protocol, the Peer I/O server 315, which uses the half-duplex command/response ISO 7816 protocol to support full-duplex peer-to-peer Internet protocols. Similarly, the network UICC 301 communication module 321 implements a Peer I/O client 325. Because the communication module 311 is interfaced to the RAS module 309 through the virtual serial port 313, handset 303 application programs 305 may use RAS calls to the virtual serial port 313 to establish network connections with the network UICC 301 with the Peer I/O server 315 as an intermediary.

The Peer I/O server 315 is further connected to a UICC Link Layer module 319. The UICC Link Layer module 319 transmits and receives APDU frames over the physical connection to the UICC 301. The APDU frames are provided to the UICC link layer module 319 by the Peer I/O server 315 and received from the handset 303.

At the other end of the physical link, the network UICC 301 contains a UICC communications module 321. The UICC communications module 321 contains implementations for the Internet protocols, e.g., TCP/IP and PPP, e.g., card TCP/IP module 323. The UICC communications module 321 also contains the Peer I/O client 325 to manage the communication of Internet protocol over the ISO 7816 channel as discussed herein above.

The Peer I/O protocol enables the half-duplex command/response protocol ISO 7816 to handle full-duplex peer-to-peer Internet protocols. Implementations of Peer I/O consist of two finite state machines: the Peer I/O server 315 running inside the mobile device and the Peer I/O client 325 running inside the UICC. The Peer I/O server 315 forwards the data between the half-duplex command/response communication module (ISO 7816) and full-duplex peer-to-peer communication module (PPP). The Peer I/O server 315 buffers and controls the data flow, but does not examine or change the data passing through it.

One implementation of Peer I/O described in the co-pending patent application defines a new ISO 7816 command class and three new instructions. This works well and is simple to implement when the software developer has access to the ISO layer. However, if the network connection to UICC is to be added to an existing operating system of a mobile device and the operating system of the mobile device does not provide a way to access the ISO layer, that solution is not possible. Accordingly, in a preferred embodiment of the invention the Peer I/O server 315 is implemented using existing ISO 7816 commands. In another alternative embodiment, the Peer I/O server 315 uses the application programming interface in the mobile device for sending and receiving data.

One way to use existing ISO 7816 commands is to use the ISO 7816 ENVELOP command for putting packets and polling, and to use the ISO 7816 GET_RESPONSE command for getting packets. The polling can be done by an ENVELOP command with no data or with one byte that never appears in a data stream. For example, the PPP layer can be configured that 0×00 never appears in PPP frames. The PPP negotiation can include a method to disallow certain characters from appearing in a data stream. When such characters appear, the sender converts them to different characters and the receiver converts them back according to a predefined method.

In an embodiment of the invention using the Microsoft smartphone as the handset 303, the API of the mobile device provide ENVELOP and GET_RESPONSE commands. Thus, the Peer I/O server 315 may make use of those commands to implement the putting and polling of packets.

Figure 4:
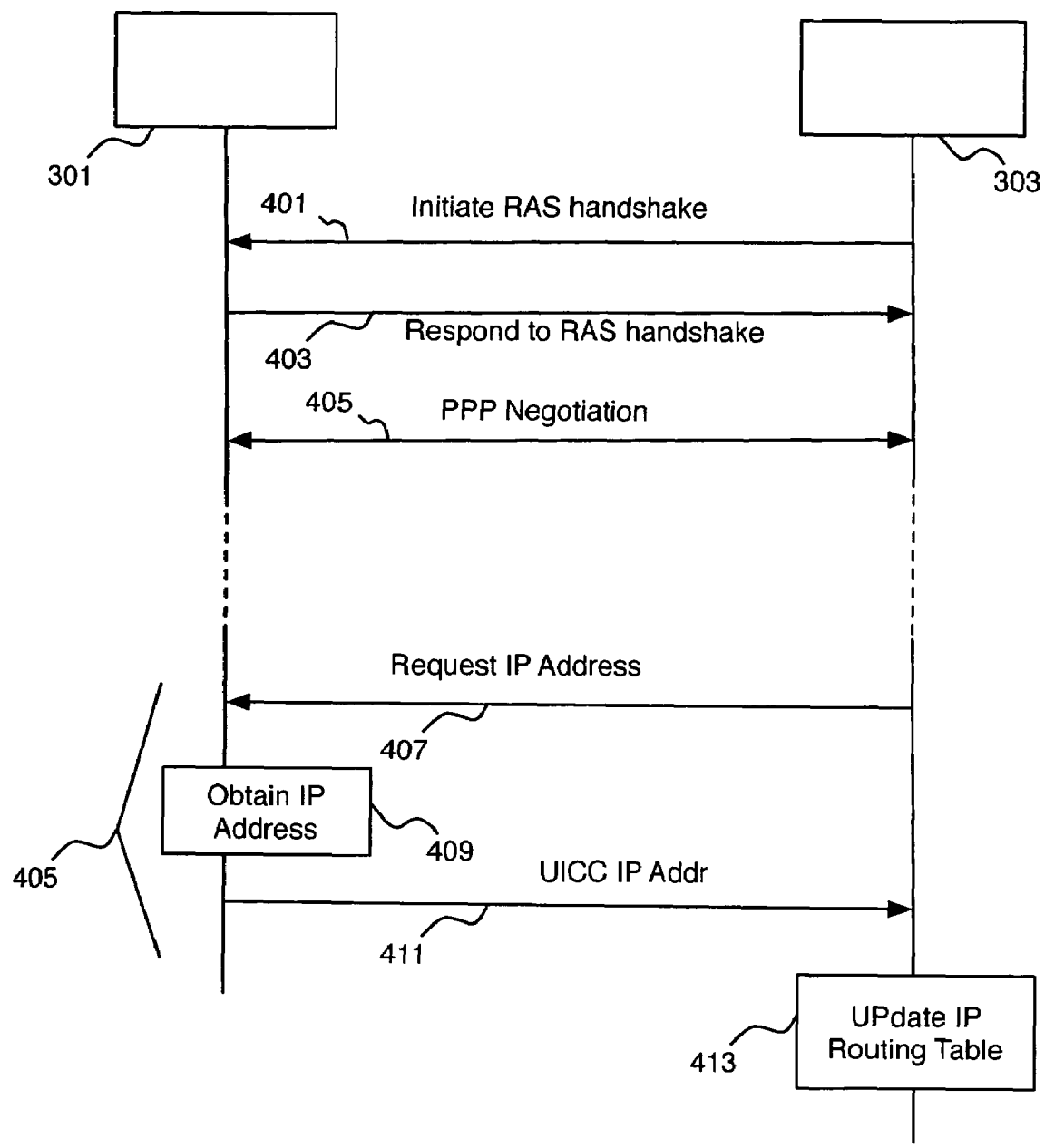
FIG. 4 is a timing-sequence diagram illustrating the establishment of a connection between a mobile device and a network UICC according to the invention.

FIG. 4 is a timing-sequence diagram illustrating the establishment of a connection between a handset 303 and a network UICC 301. Traditionally, mobile devices are normally end points of a network. Mobile devices usually do not have RAS server support, which means such mobile devices can only "dial out" to a network, that is, be a client requesting connection to a network, and cannot be "dialed in", that is, cannot be a server responding to connection requests. Therefore, to initialize the RAS connection, the handset 303 connects to the network UICC 301 by initiating RAS handshaking, step 401. The network UICC 301 responds to the handshaking, step 403. The PPP negotiation starts after the RAS handshaking finishes, step 405. The PPP connection enables communications between the mobile device and the network SIM using Internet protocols, such as TCP/IP, using the TCP/IP module 317.

3.2 Connection Status

Figure 5:
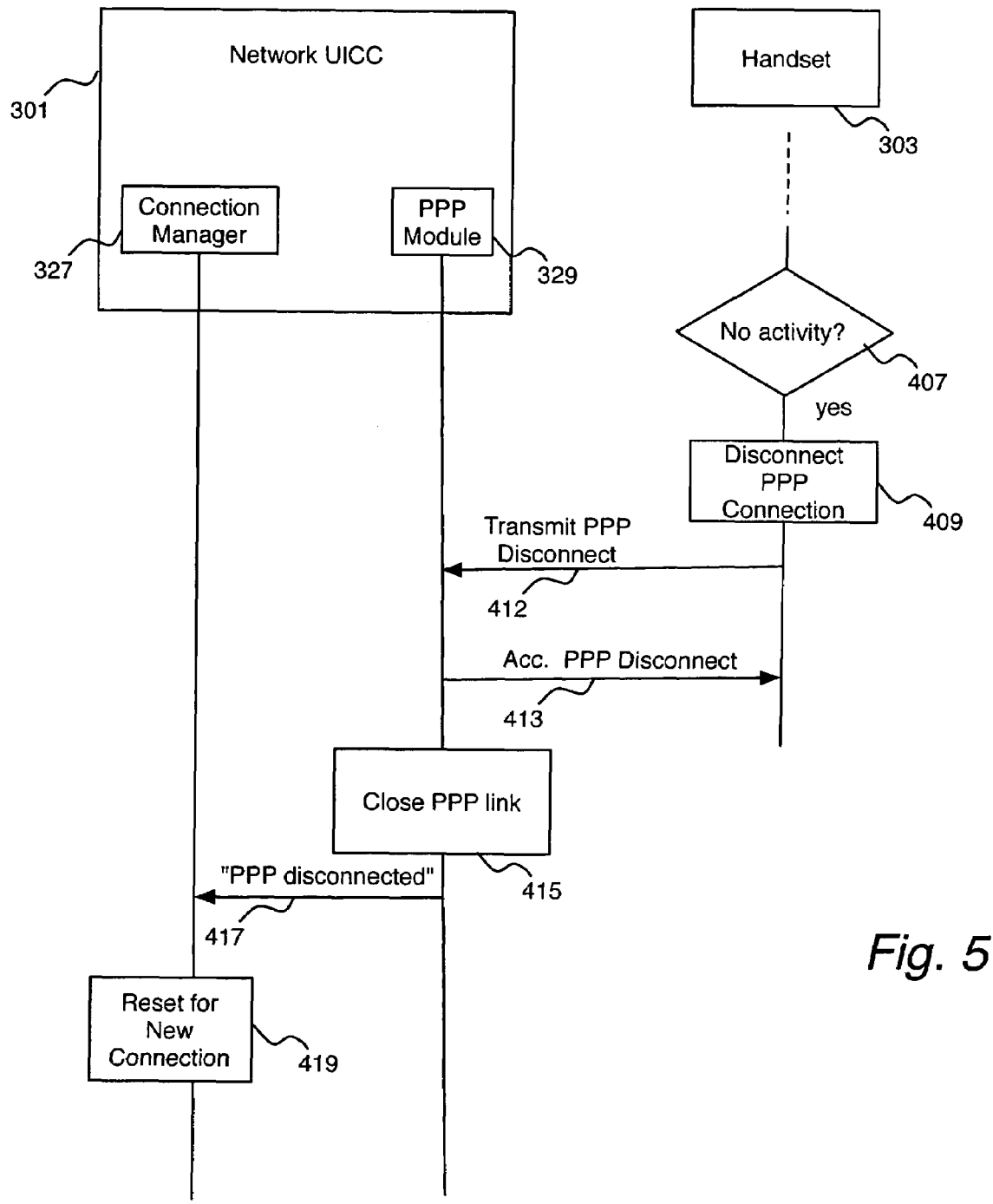
FIG. 5 is a combination of timing sequence diagram and flow-chart illustrating the operation of the network UICC and the mobile device, according to the invention, during a PPP disconnect.

The handset 303 may disconnect the PPP connection, step 409, after a certain period of time has elapsed without network activities, decision 407. FIG. 5 is a combination timing sequence diagram and flow-chart illustrating the operation of the network UICC 301 and the handset 303 during a PPP disconnect. The handset 303 transmits a PPP disconnect message to the network UICC 301, message 412. The handset 303 may not provide means to allow a user to disable this auto-disconnect feature. After the PPP disconnection, the handset 303 cannot communicate with the network SIM using Internet protocols. When an Internet application on the mobile device tries to access the network SIM using Internet protocols, for example, a web browser executing on the handset 303 attempts to access a web server on the network UICC 301, the RAS module 309 on the handset 303 tries to re-establish the network connection with the network UICC 301 by initiating the RAS handshaking, i.e., returning to step 401, et seq. The link layer of the network UICC 301 must be reset to properly handle subsequent re-connection requests.

The PPP connection and disconnection status caused by the timeout of the handset 303 should be transparent to the upper layers, such as TCP/IP, security, and applications, of the network UICC 301. In a preferred embodiment, the network UICC 301 contains a module, the connection manager 327, which maintains this transparency from the higher-level modules and applications. The connection manager 327 provides an interface between the PPP module 329 and the upper layer, e.g., the TCP/IP module 323. The connection manager 327 normally forwards the PPP function calls that the connection manager 327 receives from the upper layer modules to the PPP module 329, and vice versa. When the PPP module 329 receives the termination request from the handset 303, the PPP module 329 acknowledges the termination request, message 413, performs the appropriate PPP operations to close down the link, step 415, and informs the connection manager about the disconnection, step 417. The connection manager 327 re-initializes the RAS module on the network SIM, step 419. That resets the RAS module on the network UICC 301, i.e., places the RAS module in a state in which the RAS module is available or the RAS handshaking and would complete any attempted RAS handshake from the handset 303. When the connection is up, the connection manager 327 continues its normal function of forwarding PPP function calls. Through this mechanism, the upper layers of the network UICC 301 may remain unaware of changes of PPP connection status and carry on their functions as usual.

3.3 IP Addresses and Routing

As discussed herein above, hitherto mobile devices have been end-points in network connections. In other words, no network communication has passed through the mobile device form one node to another. This characteristic of mobile devices sets them apart from most other computers on a network, which typically can route messages in a path along a communication channel. To address this characteristic of mobile devices, in one embodiment of the invention the communication module 311 of the handset 303 contains an IP routing module 331 to selectively route incoming IP packets either to the network, the network UICC 301, or back to the handset 303.

The PPP negotiation 405 includes IP address assignment. Typically the RAS client requests an IP address from the RAS server. In one embodiment of the invention, the handset 303 requests an IP address from the network UICC 301 during PPP negotiation 405, message 407. The network UICC 301 also needs an IP address, step 409. One way to assign IP addresses is to use private IP addresses, such as 192.168.0.2. Another way to assign IP address is to use auto-configuration IP addresses, such as 169.254.0.2. However, the IP address is assigned, the network UICC 301 sends the IP address back to the handset 303, message 411.

The RAS module 309 on the handset 303 updates the IP routing table after the handset 303 obtains an IP address via PPP negotiation, step 413. This is an existing functionality of the mobile device. Once the IP address of the network UICC 301 is available on the handset 303, a user may access the network UICC 301 through a web browser on the handset 303 by using the IP address of the network UICC 301, for example, https://192.168.0.1/.

3.4 Dispatch of Network Traffic to SIM Module or Networking Functions of UICC

The network UICC 301 combines the SIM functionality of a traditional SIM card and the networking capabilities of a network smart card. Thus, the network UICC 301 contains a SIM module 333 that provides the traditional SIM card functionalities.

Figure 6:
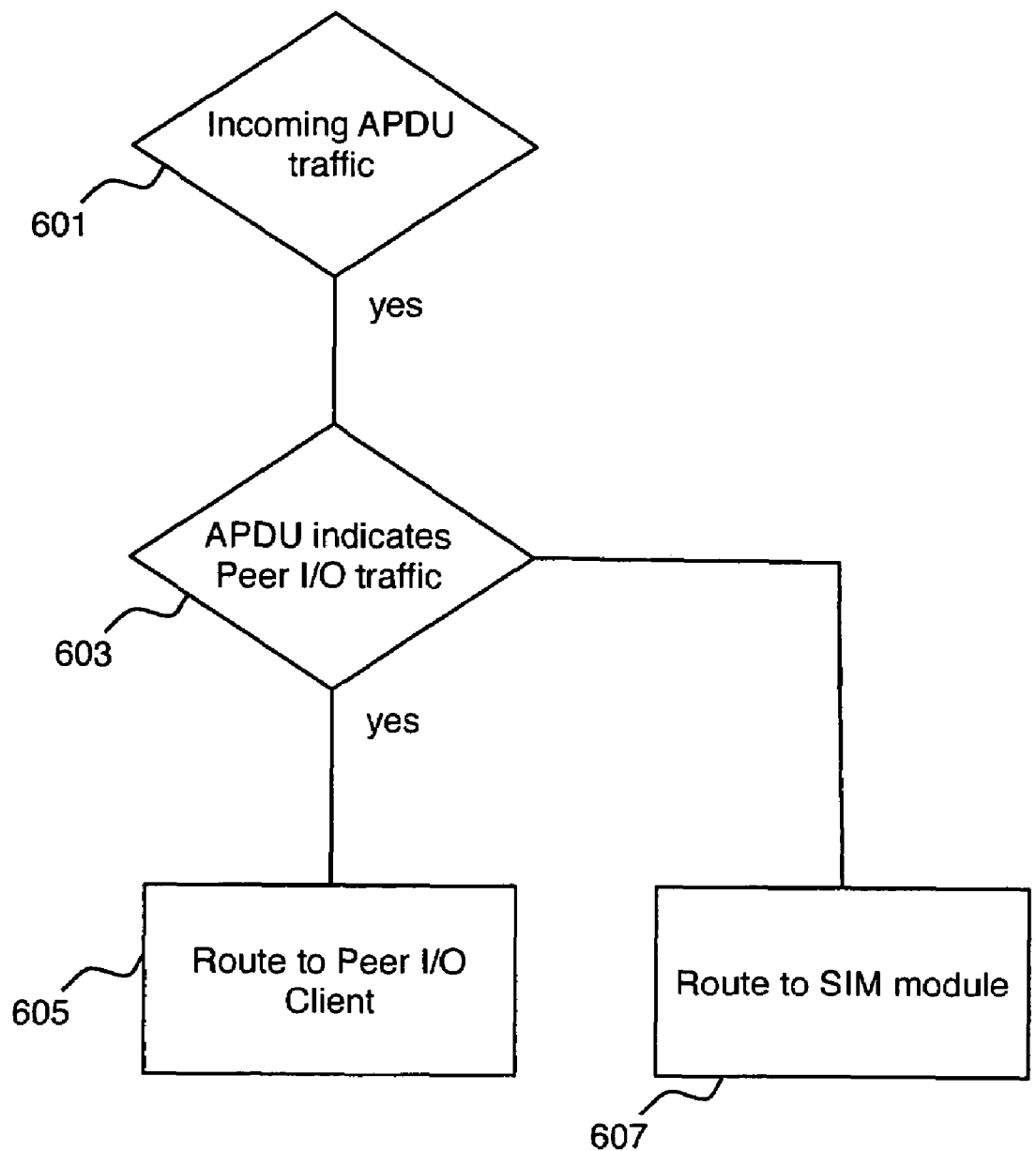
FIG. 6 is a flow-chart illustrating the dispatching of incoming APDU frames in a network UICC according to the invention.

A card-side UICC link layer module 335 provides the card-side ISO 7816 communication with the UICC link layer module on the handset 303. The card-side UICC link layer module 335 handles both Peer I/O traffic for network protocol communication and the normal SIM communication. FIG. 6 is a flow-chart illustrating the dispatching of incoming APDU frames. For incoming APDU data, step 601, if the APDU command class indicates that the data is Peer I/O traffic, decision box 603, the card-side UICC link layer module 335 dispatches the ISO 7816 application programming data units (APDU) to the Peer I/O module 325. If the APDU command class indicates that Peer I/O traffic has been received, decision block 603, the card-side UICC link layer module 335 dispatches the APDU to the Peer I/O module 325, step 605. Otherwise, card-side UICC link layer module 335 dispatches the APDU to the SIM module 333. For out going data, both the Peer I/O module 335 and the SIM module 333 use the ISO 7816 module to send data. This enables the network SIM to be used as a network smart card as well as for normal cell phone operation, such as authentication to a cellular network. In one embodiment of the invention, instructions for implementing the decision logic of FIG. 6 may be implemented as part of an interface between the UICC link layer module 335 and the Peer I/O module 335.

4.0 Methods of Use of a Network UICC 4.1 Browsing the UICC

The mechanism, described herein above, for allowing communication of high-level Internet protocol communications between the handset 303 and the UICC 301 further permits a UICC 301 to execute a web server. The web server may be one of the applications 307. For purpose of discussion, the web server will be assumed to be application 307a. Many mobile devices 303 have web browsing capability built in. Thus, by virtue of having the web server 307a and the web browsing capability on the handset 303, together with a mechanism for allowing the handset 303 to communicate using high level Internet communications protocols with the UICC 301, a user may access the UICC 301 using a web browser on the handset 303. Furthermore, because the UICC 301 as described herein is capable of acting as an autonomous network node, a web browser anywhere on a network to which the UICC 301 is connected (via the handset 303) may be used to access the UICC 301.

Figure 8:
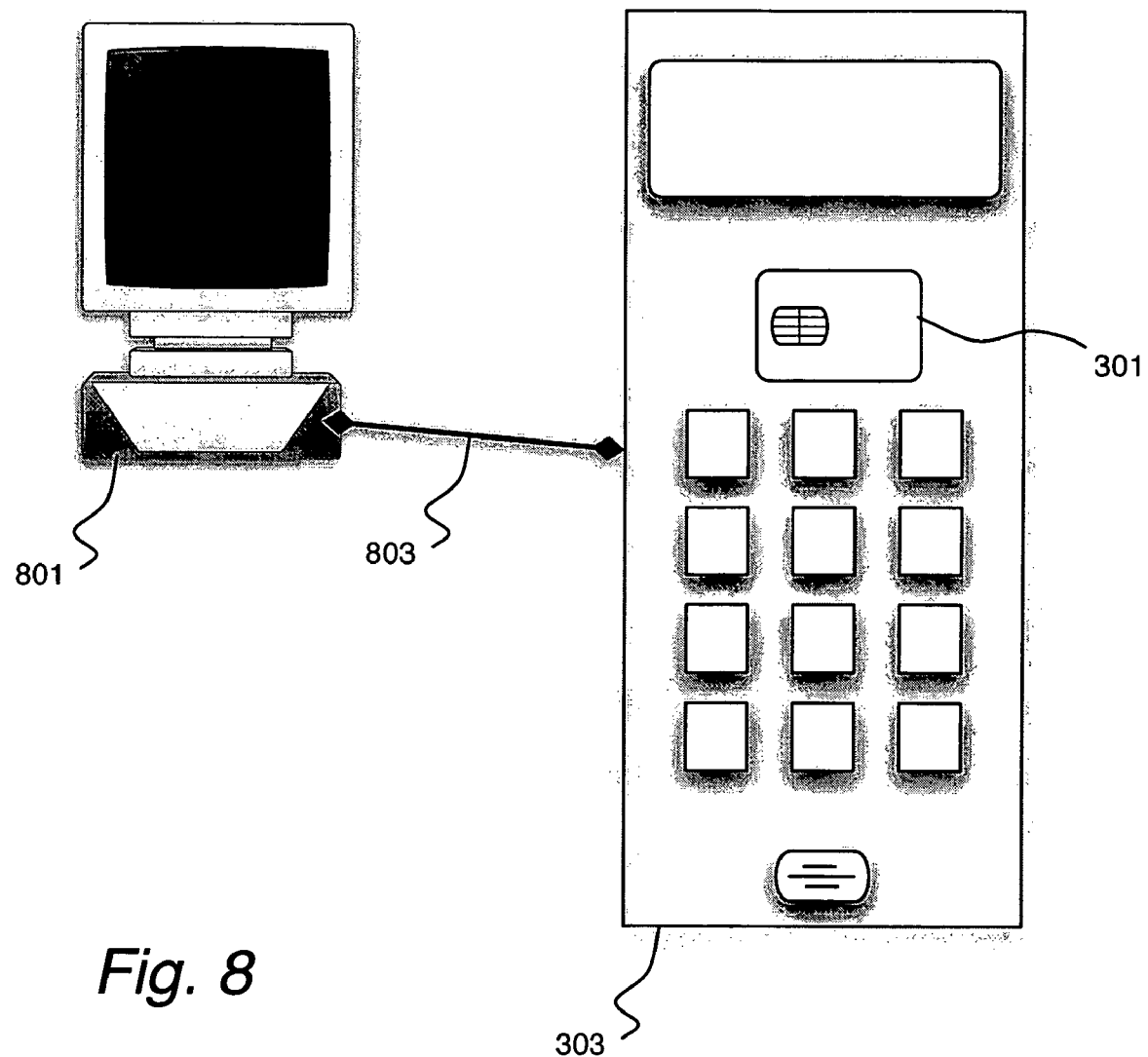
FIG. 8 is a high-level schematic illustration of a computer connected to a handset and there-through to a UICC.

FIG. 8 is a schematic illustration of a computer 801 connected to a handset 303 via a connection 803. The connection 803 is a direct (as opposed to over a network) connection between the computer 801 and the handset 303. The connection 803 may be a USB cable or an infrared connection via infrared ports on the computer and the handset 303.

According to the invention there are two alternative methods for direct network communication between a computer and network UICC 301. In a first embodiment, illustrated in FIG. 9, two proxies, a proxy web server running on the computer 801 and TCP proxy server running on the handset 303 facilitate the connection. In the second alternative embodiment, illustrated in FIG. 10, a RAS connection is made from the computer 801 to the handset 303. These methods enable the mobile device user to use a web browser on his/her desktop computer to access the network UICC 301. In this way, the user has a good human interface, provided by the web browser, and a keyboard to manage the network UICC 301. In addition, the network UICC 301 can secure the communication between the computer and other networks (e.g., Wi-Fi networks).

Figure 9:
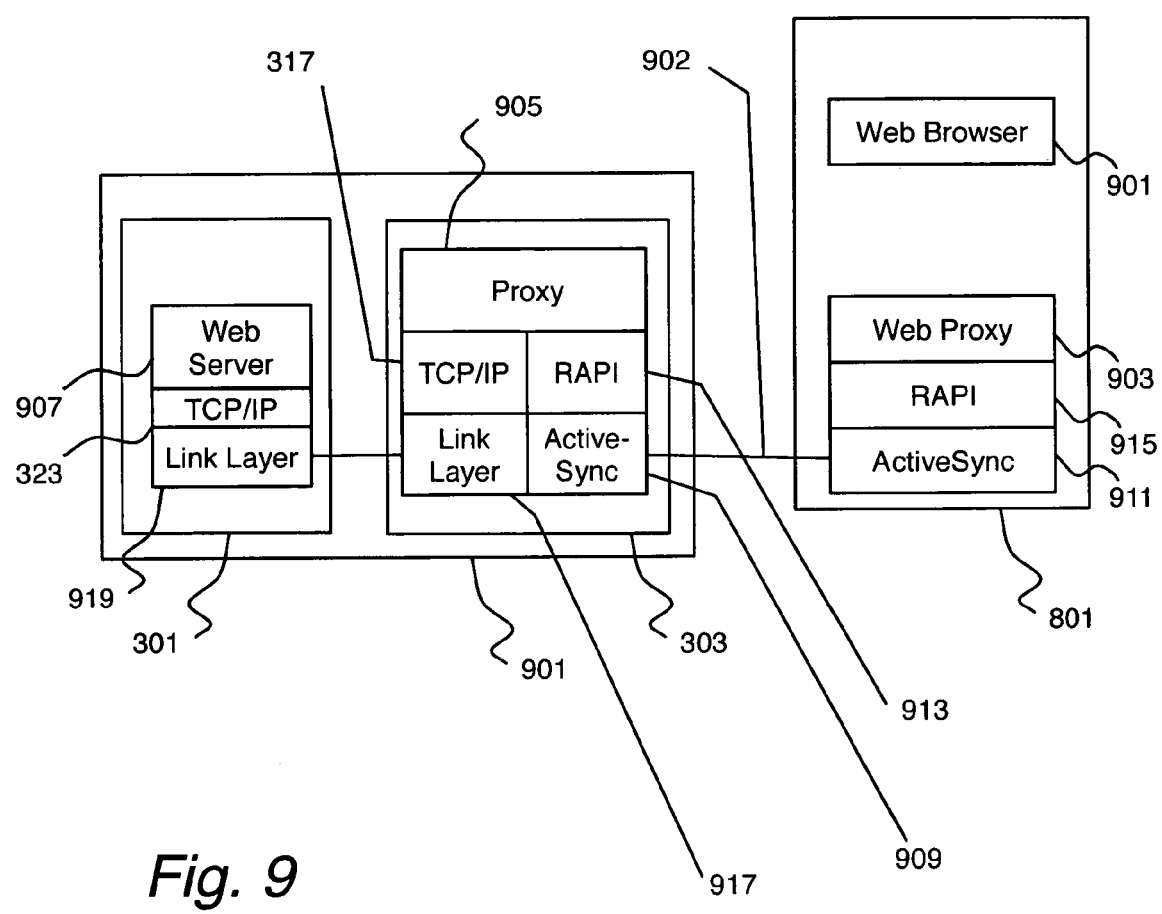
FIG. 9 is a schematic illustration of a proxy method for enabling the use of a web browser to interact with a network UICC using the communications methods introduced by the invention.

FIG. 9 is a schematic illustration of the software and hardware architecture for a one method, which uses web proxies, for enabling the use of a web browser 901 to interact with a network UICC 301. Via a proxy web server 903 running on the computer 801 and a TCP proxy server 905 running on the handset 303, http requests and responses are transmitted between a web server 907 on the network UICC 301 and the web browser 901 on the computer 801.

In one embodiment of the invention as illustrated in FIG. 9, the mobile device executes the Microsoft Smartphone operating system and makes use of at least two tools provided by the mobile device operating system. One tool is the ActiveSync synchronization software, with ActiveSync modules 909 and 911, on the handset 303 and on the computer 801, respectively. The ActiveSync modules provide connection and data synchronization between a computer and a mobile device over a USB cable or an infrared connection. The embodiment of the invention illustrated in FIG. 9 also makes use of Remote API (RAPI). RAPI is an application programming interface and a library, with modules 913 and 915 executing on the handset 303 and on the computer 801, respectively, and that provide a means for an application running (e.g., web browser 901) on the computer 801 to communicate with an application 305 running on the handset 303 via the ActiveSync modules 909 and 911. To simplify the figure, the link layers for PPP, Peer I/O and APDU are represented by link layer modules 917 and 919, respectively.

Figure 11:
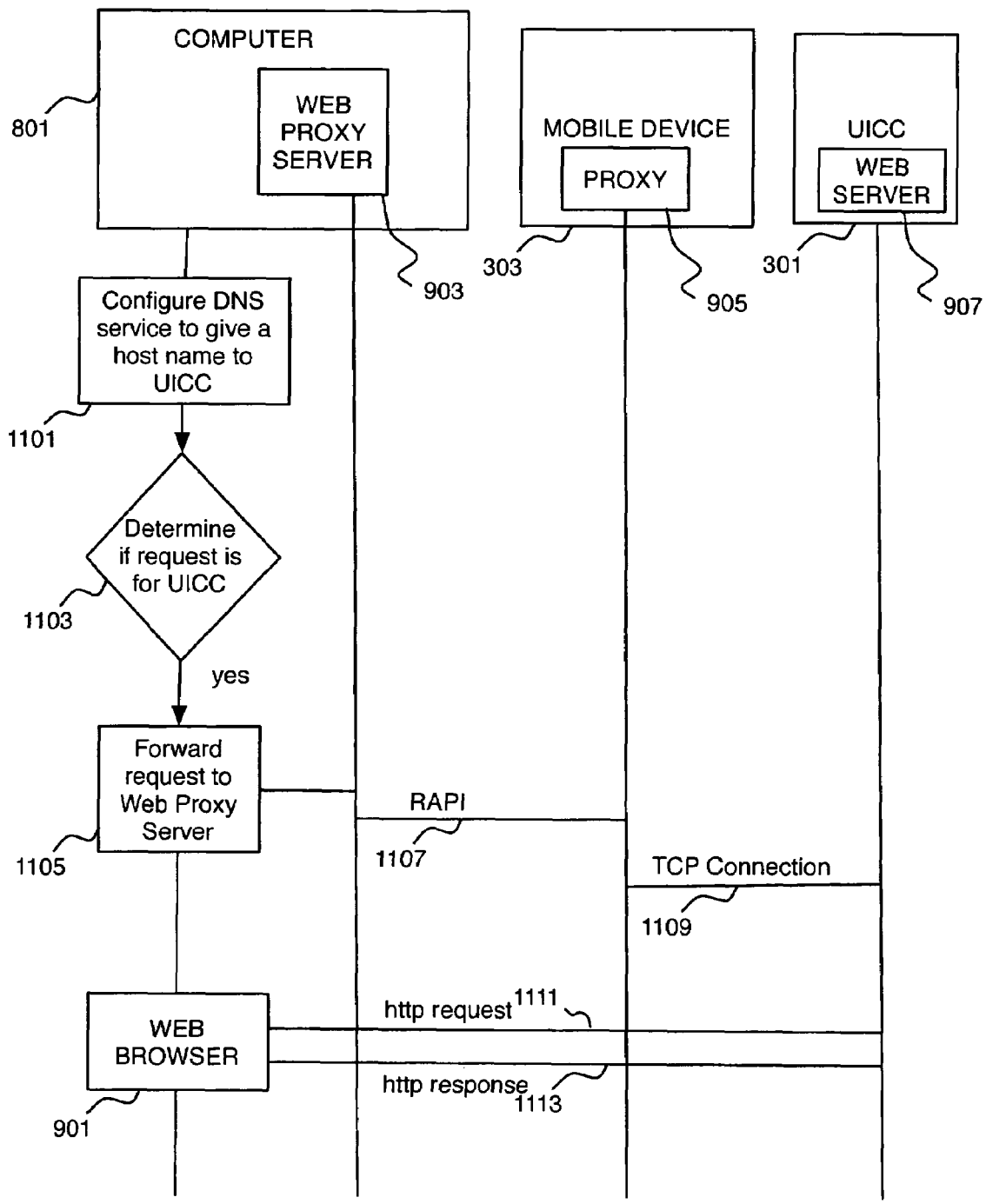
FIG. 11 is a flow chart illustrating the operation of the embodiment of FIG. 9.

FIG. 11 is a flow chart illustrating the operation of the embodiment of FIG. 9 for providing a mechanism for a web browser 901 on a computer 801 to communicate with a web server 907 on the UICC 301 over a direct communication link, e.g., USB or an infrared link.

First, the computer 801 is operated to configure the DNS service to give a host name to the network UICC 301, step 1101. The user can then use this host name with the web browser 901 on the computer 801 to access the network UICC 301. With Windows or Linux operating systems, one can achieve this by adding a new line in the file named "hosts" in the system directory (for example, with Windows 2000, this "hosts" file is located in the C:\WINNT\system32\drivers\etc directory). The new line contains the name of the network UICC 301, for example "Axalto-Network-SIM-Card" and the local IP address "127.0.0.1".

Next, upon entry of a request by a user, the computer 801 operates to determine if the request is directed to the network UICC 301 or to another address, step 1103. Typically the operating system of the computer 801 can be configured to determine this. Only the connection to the network UICC 301 is passed through the proxy running on the computer. Other connections to the Internet from the web browser go directly to the Internet without passing to the web proxy on the computer. If, the user types "Axalto-Network-SIM-Card", i.e., the name established for the network UICC in step 1101, as the host name in the web browser 901 address bar to connect to the network UICC 301, because the corresponding IP address of the "Axalto-Network-SIM-Card" is the loopback address "127.0.0.1", i.e., the address pointing to the web server on the local machine, here computer 801, the operating system of the computer 801 forwards the HTTP requests to the web proxy server 903 running on the computer 801 and waiting on the web server port 80, step 1105. Assuming that the computer 801 does not have another web server running on it, the web proxy server 903 would be invoked as the web server for computer 801.

The proxy server 903 on the computer uses the RAPI modules 915 and 913, respectively, to invoke the proxy server 905 on the mobile device, step 1107. The proxy 905 on the mobile device opens a TCP socket connection, using the TCP/IP layer 317 of the communication module 311 (see FIG. 3) to connect to the web server 907 on the network UICC 301, step 1109. Thus, the HTTP requests 1111 and responses 1113 are transmitted between the web server 907 on the network UICC 301 and the web browser 901 on the computer 801 with the help of the two proxies 903 and 905.

The domain name "Axalto-Network-SIM-Card" is only valid for the local connection to the network UICC 301.

Figure 10:
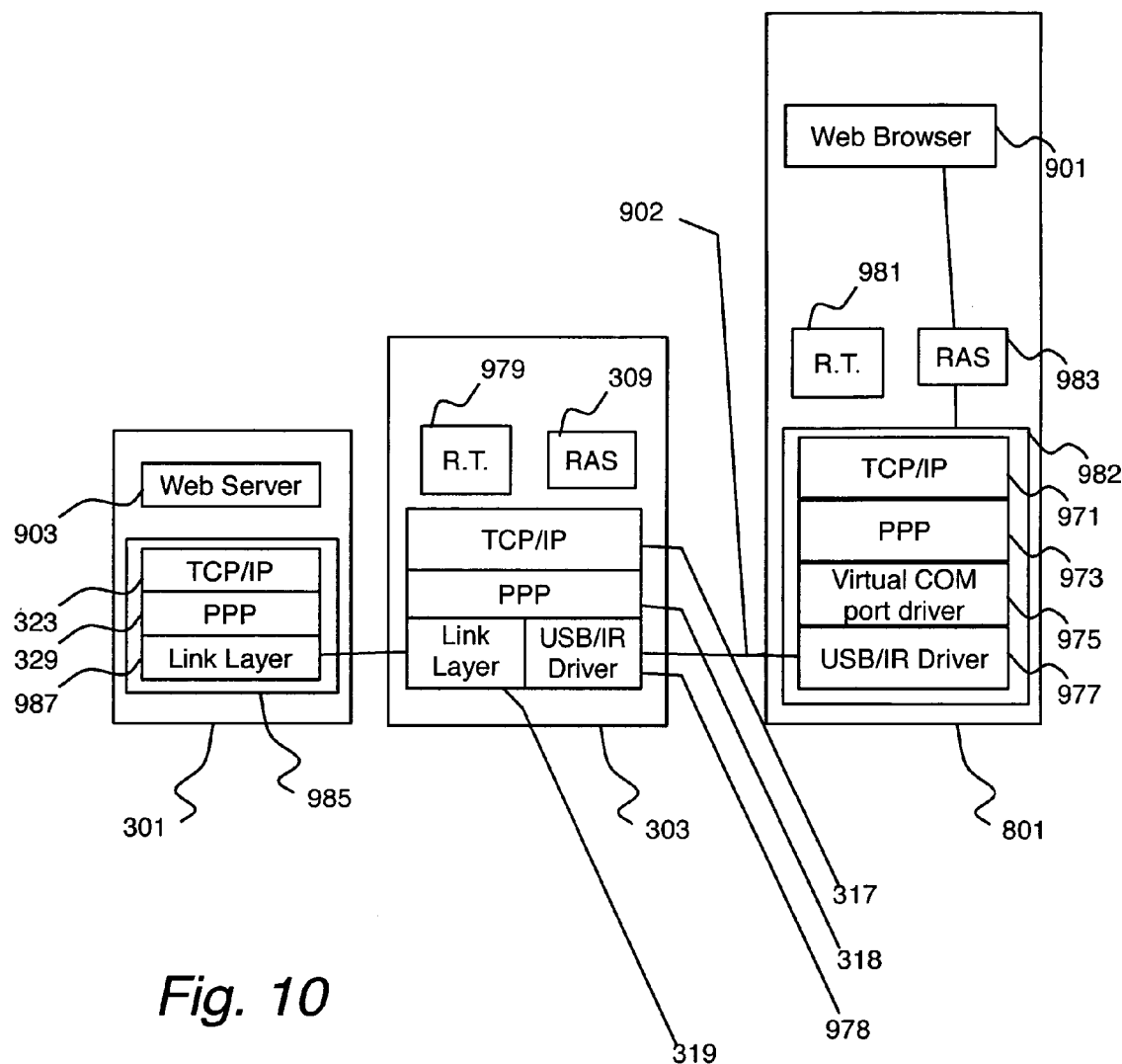
FIG. 10 is a schematic illustration of the software and hardware architecture for one alternate method, which uses RAS, for enabling the use of a web browser to interact with a network UICC.

FIG. 10 is a schematic illustration of the software and hardware architecture for one alternate method, which uses RAS, for enabling the use of a web browser 901 to interact with a network UICC 301. This alternative method for using a direct connection to connect a web browser 901 on the computer 801 to a web server 903 on the network UICC 301, called the RAS method, includes establishing a PPP connection and then an IP connection from the handset 303 to the computer 801 over a direct physical connection 902, e.g., a USB cable or Infrared port. On the computer 801, a web browser 901 calls, by making function calls on a RAS module 983, on a communication module 982 containing a TCP/IP layer 971, a PPP layer 973, a Virtual COM port driver 975, and a USB/IR driver 977.

In addition to the communications modules described herein above for implementing the various layers of the communications stack supported by the handset 303, the handset 303 contains a USB or IR Driver 978 for receiving and sending data on the USB or IR link between the handset 303 and the computer 801, specifically the computer-side USB/IR driver 977.

Figure 12:
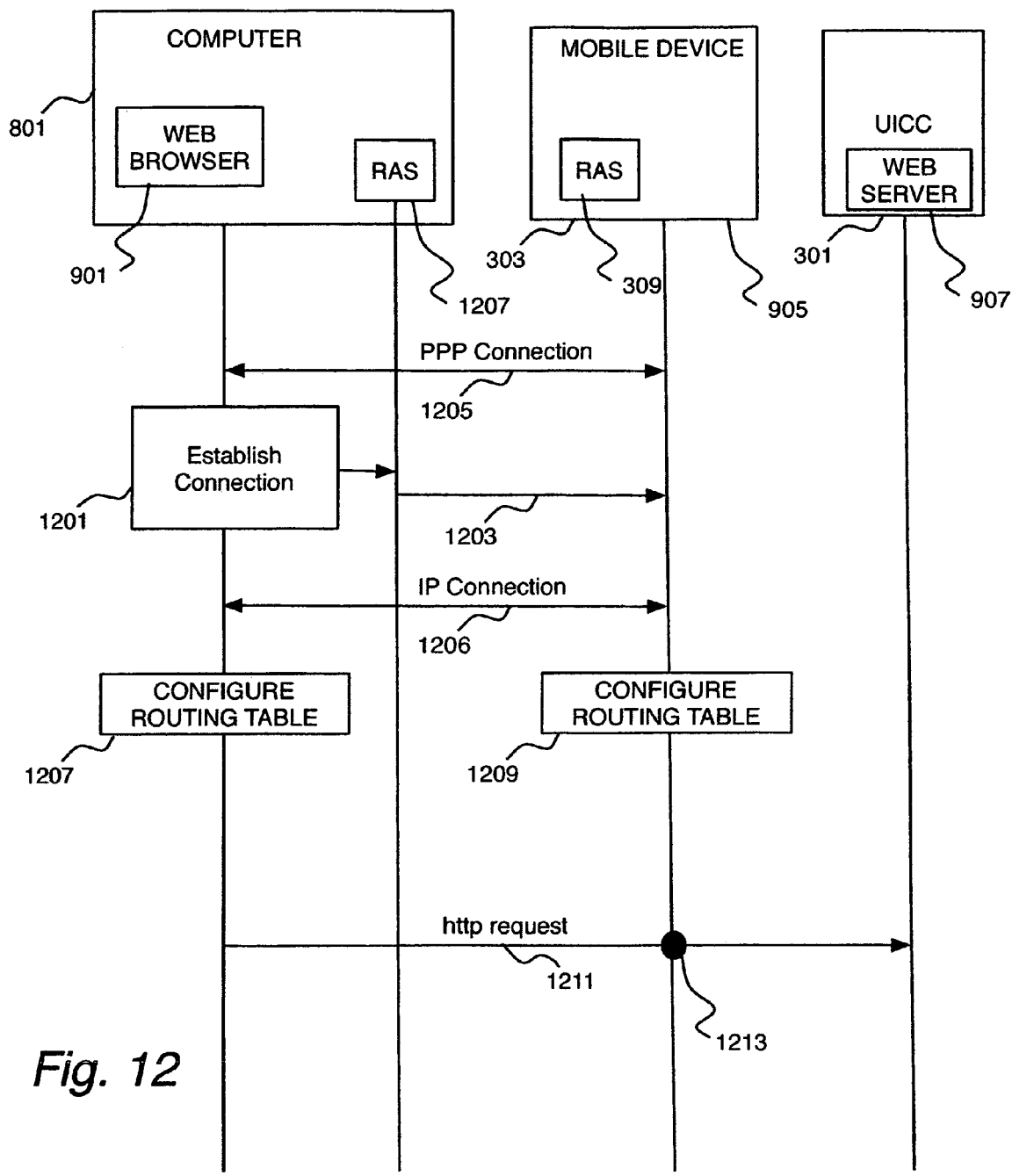
FIG. 12 is a flow-chart illustrating the operation of the embodiment illustrated in FIG. 10.

FIG. 12 is a flow-chart illustrating the operation of the embodiment illustrated in FIG. 10. When the computer 801 and handset 303 are connected a PPP connection is established between the two, step 1205. When the web browser 901 requires a connection to the web server 903 on the network UICC 301, the web browser 901 calls on RAS 983, step 1201, to establish a new RAS connection to the handset 303, step 1203, that can accept and handle PPP communication, as described hereinabove. The dial tool of the mobile device RAS 309 is then used to establish an IP connection with the computer, step 1206. Because the RAS does not support connections through a USB cable, a virtual serial port (COM in Windows world) driver is added to communicate through USB. The virtual COM port driver 975 permits the RAS server 1207 on the computer 801 to wait for a new connection over the USB cable that the handset 303 is connected to. Using Infrared port (IrDA) does not require the installation of a virtual COM port driver, because RAS can establish connection through IrDA.

After establishing the network connection between the mobile device 905 and the computer 801, the utility functions of the RAS modules 983 and 309 are used to configure the routing table 981 on the computer 801 and routing table 979 on the handset 303, steps 1207 and 1209, respectively. For example, a user of the computer 801 may make calls to the route utilities to add entries to the routing table 981 and similarly, on the handset 303. On Windows systems, the routing table entries are created using the "Route" command.

With the two routing tables 981 and 979 updated, the handset 303 may act as a router between the computer 801 and the network UICC 301 and enables the computer 801 to send packets intended for the network UICC 301 via the handset 303. A requirement for the RAS method is that the IP address of the network UICC must be routable. Thus, private and automatic IP addresses, being un-routable, may not be used. After the routing tables 979 and 981 are configured, the user can use the web browser 901 on the computer to access the network UICC 301 in the mobile device 905. Upon receipt of an http request 1211, the TCP/IP module 317 on the handset 303, and directed by the IP router 331, using the routing table 979, routes, step 1213, the request to the network UICC 301. If the packet is intended for the network UICC 301 (as indicated by the packets destination address), the IP router 331 directs the TCP/IP module 317 to direct the packet to the link layer module 319. The network UICC 301 receives the TCP/IP packets on a communications module 985 implementing a link layer 987, which encompasses the Peer I/O client 325 and UICC Link Layer Module 335, a PPP layer 329, and a TCP/IP layer 323.

4.2 Internet Access from a Network UICC

In another aspect of the invention, because the network UICC 301 as described herein above, used in conjunction with a handset 303 as described herein above, has the ability to act as an autonomous network node, it is possible to extend the network UICC 301 and handset 303 to allow a network connection between the network UICC 301 and any webserver on the Internet. Consider the network diagram of FIG. 1. A web server may be located on the remote network node 127. According to an embodiment of the invention the network UICC 301 may connect directly to that web server.

Usually a mobile device, such as a handset, connects to the Internet through GPRS, WLAN, or a desktop computer with USB cable or other type of connection. The handset usually has a private IP address that cannot be seen from the Internet because the handset is usually behind a firewall or a NAT server of the mobile operator or local LAN. The same is true for the network SIM in the handset, the network SIM has a private IP address that cannot be seen from the Internet.

If the handset has the Internet connection and the handset has a NAT service, the network SIM will have also the Internet connection from to the NAT service in the handset. Hitherto, even with the latest version of Microsoft Windows Smartphone 2003, this feature is not available for the Smartphone. Until new versions of mobile phone operating systems will have the NAT service feature enabled, other solutions are needed.

Figure 13:
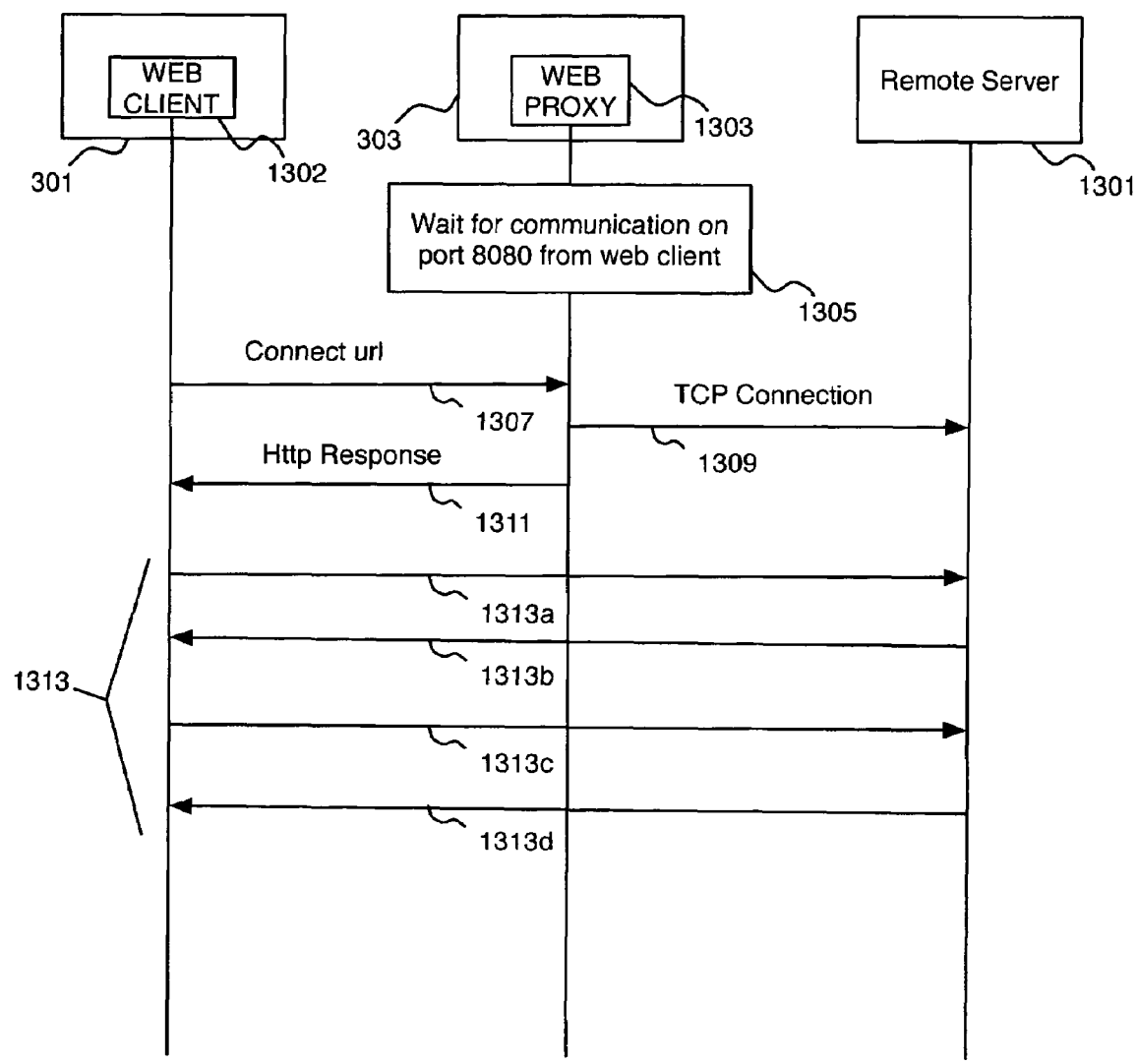
FIG. 13 is a timing sequence diagram illustrating an embodiment of the invention in which a web proxy service on the handset provides a web tunneling service for a direct connection from a web client on the network UICC to a remote web server.

FIG. 13 is a timing sequence diagram illustrating an embodiment of the invention in which a web proxy service 1303 on the handset 303 provides a web tunneling service for a direct connection from a web client 1302 on the network UICC 301 to a remote web server 1301. This solution may be used when a handset 303 has an Internet connection but does not provide a NAT service. A. Luotnonen, Tunneling TCP based protocols through Web proxy services, INTERNET-DRAFT, IETF, August 1998, http://www.web-cache.com/Writings/Internet-Drafts/draft-luotonen-web-proxy-tunneling-01.txt, the entire disclosure of which is incorporated herein by reference, provides a description of how to use the CONNECT method of HTTP 1.1 to tunnel TCP based protocols through a web proxy service. The applicable TCP based protocols include HTTP, and HTTPS with SSL and TLS.

Until a connection has been established, the web proxy 1303 waits on the port 8080 from the web client 1302 on the network UICC 301, step 1305.

When the web client 1302 in the network UICC 301 wants to establish an SSL connection with a remote server 1301 over the Internet, for example, to the Amazon.com web server, the network UICC 301 opens a TCP connection to the handset 303 on the port 8080 where the web proxy 1303 listens by issuing the following request on port 8080, step 1307:

CONNECT www.amazon.com:443 HTTP/1.0
User-agent: Mozilla/4.0

From this request, the web proxy 1303 determines the url of the web server 1301 that the web client 1302 on the network UICC 301 desires to connect, e.g., to the www.amazon.com server, and that the connection is to be on the port 443. Having determined the destination, the web proxy 1303 establishes a new TCP connection to the web server 1301 on the port 443, step 1309. Port 443 is the port used for SSL connections. If the TCP connection with the Amazon server is achieved successfully, the web proxy answers to the web client 1302 on the network UICC 301 with the following response, step 1311:

HTTP/1.0 200 Connection established
Proxy-agent: Web-Proxy/1.1

This response indicates that the connection to the remote server 1301 has been established. The web client 1302 can begin the SSL session 1313 (with data traffic 1313a-1313d) with the remote server 1301. The web proxy 1303 on the handset just moves data back and forth between the web client 1301 on the network UICC 301 and the remote server 1301. The tunneling web proxy service 103 merely moves encrypted data between the UICC 301 and the web server 1301 and does not affect the secure transaction.

The first request, message 1307, from the network UICC 301 to the web proxy 1303 only has the mission to inform the web proxy 1303 the name of the remote server 1301 and the port corresponding to the type of the session to follow. The web proxy service 1303 can work for the normal HTTP session between the web client 1302 on the network UICC 301 and the remote web server 1301 on the Internet as well. In this case the port followed by the remote server name is 80 instead of 443, the following data sent by the web client 1302 in the network UICC 301 is the normal HTTP request.

With the HTTP proxy tunneling service described above, the web client 1302 in the network UICC 301 can establish a direct secure SSL or TLS or a normal HTTP session to any web server 1301 on the Internet. In the case of SSL/TLS connection, the security is the same as without the tunneling service.

6. Applications

The network UICC 301 can have many applications. This section describes a few of these applications.

Mobile payments play an important role in e-commerce because of the popularity of mobile devices and the integration of mobile networks into the Internet. In addition, the mobile device is a personal device that users carry with them all the time. In these mobile devices, the SIM card is the most secure place to store important personal information. For example, the SIM card can store the user's bank credit card information to make a mobile payment.

The invention provides a method that turns the SIM card in the mobile device into a real autonomous network node. The network UICC 301, with its own IP address and an IP/TCP/HTTP protocol stack, is a true network node on the Internet. So enabled, the network UICC 301 may make use of network security protocols for secure communication with other network nodes. In addition, the network UICC 301 can support other applications on top of the Internet protocols.

With a network UICC 301 on the handset 303, a user can use the web browser on the handset 303 or on a host computer to buy goods or services on the Internet, but the payment can always be done directly between the network UICC 301 and the merchant server. This provides a secure mobile payment method.

Users can use the web browser on the mobile device or on the computer to access the network UICC to customize personal information such as the data held in a phone book or a calendar, or SMS messages. The mobile network operators can use the HTTP protocol to update or modify services and information in the SIM of the mobile device. Deploying the applications on the network UICC 301 will be the same as normal web server applications.

With the web server on the network UICC 301, web pages accessed by the web browser in the handset 303 can embed some script codes (e.g., Java script) that open another HTTP connection to the network UICC 301 to take the necessary personal information of the user to fill in some web forms. Therefore the user will not need to enter it manually and the information can be encrypted before passing to the server.

Applications on the mobile devices that communicate with the SIM can use the socket API to open a network connection to the SIM rather than using a limited SIM manager API or some specific API provided by a specific mobile device operating system. Because most of the operating systems on the smart mobile device support socket interface, these applications using socket API will be the same for most mobile devices.

The network UICC 301 can carry complete user interface in the handset 303. Thus, the handset 303 users can have the same user interface regardless of which handset 303 they have.

Although specific embodiments of the invention have been described and illustrated, the invention is not to be limited to the specific forms or arrangements of parts so described and illustrated. The invention is limited only by the claims.

We claim:

1. A system for communication between a mobile device having a mobile device memory and a mobile device processor and a Universal Integrated Circuit Card having a Universal Integrated Circuit Card memory and a Universal Integrated Circuit Card processor, comprising:

a mobile device communications module stored in the mobile device memory and having instructions to cause the mobile device processor to selectively communicate with the Universal Integrated Circuit Card processor or with at least one node on a network, the mobile device communications module having:

an Internet protocol module operable to receive messages issued from a first Internet application, to package the messages as Internet protocol packets, and to transmit the packets to target IP addresses; and operable to receive Internet protocol packets, to process the packets, and to send the messages contained in the packets to the first Internet application and having:

a routing module operable to receive Internet protocol packets and operable to cause the internet protocol module to transmit the packets selectively to the mobile device, to a wireless data network or to the Universal Integrated Circuit Card as a function of the target Internet protocol address of the packets;

instructions to initiate an access session;

instructions to, operable in response to a connected access session, to initiate a connection negotiation to create a connection between the mobile device and Universal Integrated Circuit Card wherein in the connection negotiation the Universal Integrated Circuit card assigns an IP address for the mobile device;
instructions to update an IP routing table such that incoming data packets intended for the Universal Integrated Circuit Card are routed to the Universal Integrated Circuit Card IP address.

2. The system for communication between a mobile device having a mobile device memory and a mobile device processor and a Universal Integrated Circuit Card having a Universal Integrated Circuit Card memory and a Universal Integrated Circuit Card processor of claim 1, wherein the access session is a RAS session and the connection negotiation is a PPP negotiation.

3. The system for communication between a mobile device having a mobile device memory and a mobile device processor and a Universal Integrated Circuit Card having a Universal Integrated Circuit Card memory and a Universal Integrated Circuit Card processor of claim 2, wherein the communications module further comprises instructions to disconnect the PPP connection and wherein the Universal Integrated Circuit Card comprises a Universal Integrated Circuit Card communications module having instructions to receive a PPP disconnect message and instructions operable in response to the PPP disconnect message reset a part of the communication module of the Universal Integrated Circuit Card to be prepared to receive a request for a new RAS session.

4. The system for communication between a mobile device having a mobile device memory and a mobile device processor and a Universal Integrated Circuit Card having a Universal Integrated Circuit Card memory and a Universal Integrated Circuit Card processor of claim 3 wherein the further comprises:
a SIM module;
a Universal Integrated Circuit Card side link layer module for linking between communications protocols for communication between a Universal Integrated Circuit Card and a host device and Internet level protocols;
instructions operable to receive physical layer data;
instructions to detect from the physical layer messages whether the incoming physical layer data is intended for the SIM module or is Internet protocol data; and
instructions to route Internet protocol data to the link layer module and SIM module data to the SIM module.

5. The system for communication between a mobile device having a mobile device memory and a mobile device processor and a Universal Integrated Circuit Card having a Universal Integrated Circuit Card memory and a Universal Integrated Circuit Card processor of claim 4 wherein the mobile device further comprises:
a mobile device-side link layer module for linking between communications protocols for communication between a Universal Integrated Circuit Card and a host device and Internet level protocols.

6. The system for communication between a mobile device having a mobile device memory and a mobile device processor and a Universal Integrated Circuit Card having a Universal Integrated Circuit Card memory and a Universal Integrated Circuit Card processor of claim 5 wherein the Universal Integrated Circuit Card-side link layer module and the mobile device-side link layer modules each comprises:
a first link layer module for communicating according to the protocol for communication between a Universal Integrated Circuit Card and a host computer;
a third link layer module for communicating according to Internet communications protocols; and
a second link layer module operable to carry data packets from the third link layer in the format of the first link layer.

7. The system for communication between a mobile device having a mobile device memory and a mobile device processor and a Universal Integrated Circuit Card having a Universal Integrated Circuit Card memory and a Universal Integrated Circuit Card processor of claim 6 wherein the protocol for communication between the Universal Integrated Circuit Card and the host computer is a half-duplex command and response protocol.

8. The system for communication between a mobile device having a mobile device memory and a mobile device processor and a Universal Integrated Circuit Card having a Universal Integrated Circuit Card memory and a Universal Integrated Circuit Card processor of claim 7 wherein the protocol for communication between the Universal Integrated Circuit Card and the host computer is the ISO-7816 APDU protocol.

9. The system for communication between a mobile device having a mobile device memory and a mobile device processor and a Universal Integrated Circuit Card having a Universal Integrated Circuit Card memory and a Universal Integrated Circuit Card processor of claim 6 wherein the second link layer modules enable the mobile device and the Universal Integrated Circuit Card to communicate using full-duplex Internet protocols wherein the communication protocol over the physical link between the mobile device and the Universal Integrated Circuit Card is half-duplex.

10. The system for communication between a mobile device having a mobile device memory and a mobile device processor and a Universal Integrated Circuit Card having a Universal Integrated Circuit Card memory and a Universal Integrated Circuit Card processor of claim 6 further comprising an interface between the first link layer module and the second link layer module of the Universal Integrated Circuit Card-side link layer module, and wherein the interface between the first link layer module and the second link layer module of the Universal Integrated Circuit Card-side link layer module comprises the instructions to detect from the physical layer messages whether the incoming physical layer data is intended for the SIM module or the Internet protocol data.

11. The system for communication between a mobile device having a mobile device memory and a mobile device processor and a Universal Integrated Circuit Card having a Universal Integrated Circuit Card memory and a Universal Integrated Circuit Card processor of claim 6 wherein the first link layer module is an implementation of the ISO 7816 communications protocol, wherein the second link layer module is a Peer I/O module, and wherein the third link layer module is a module implementing the PPP protocol.

12. The system for communication between a mobile device having a mobile device memory and a mobile device processor and a Universal Integrated Circuit Card having a Universal Integrated Circuit Card memory and a Universal Integrated Circuit Card processor of claim 1 wherein the mobile device further comprises a remote access server module operable to enable establishing connections with outside data networks wherein the network is selected from the wireless cellular data network, the network Universal Integrated Circuit Card, and other networks.

13. The system for communication between a mobile device having a mobile device memory and a mobile device processor and a Universal Integrated Circuit Card having a Universal Integrated Circuit Card memory and a Universal Integrated Circuit Card processor of claim 12 wherein the access server is operable to make network connection to the Universal Integrated Circuit Card through the serial driver.

14. The system for communication between a mobile device having a mobile device memory and a mobile device processor and a Universal Integrated Circuit Card having a Universal Integrated Circuit Card memory and a Universal Integrated Circuit Card processor of claim 1, further comprises a Universal Integrated Circuit Card communications module implementing a communications protocol stack including Internet protocols and link layer protocols and wherein the link layer module is operable carry Internet protocol data over a physical link using a link layer protocol designed for communication with a Universal Integrated Circuit Card.

15. The system for communication between a mobile device having a mobile device memory and a mobile device processor and a Universal Integrated Circuit Card having a UICC Universal Integrated Circuit Card memory and a Universal Integrated Circuit Card processor of claim 14 wherein the link layer protocols include the ISO 7816 APDU protocol and wherein the link layer module comprises an intermediate link layer module operable to carry Internet protocol data frames on APDU frames.

16. The system for communication between a mobile device having a mobile device memory and a mobile device processor and a Universal Integrated Circuit Card having a Universal Integrated Circuit Card memory and a Universal Integrated Circuit Card processor of claim 1, further comprising:
 a computer connected to the mobile device over a short range connection and wherein the first Internet application is an application program executing on the computer;
 wherein the Universal Integrated Circuit Card further comprises:
 a second Internet application;
 a card-side communications module to receive messages issued from the first Internet application for dispatch to the second Internet application executing on the Universal Integrated Circuit Card, to unpackage incoming Internet protocol packets, and to dispatch messages in the packets to the second Internet application; and operable to receive messages from the second application for transmission to the first Internet application, to package the messages into Internet protocol packets, and to send the packets to the second Internet application
 wherein the second Internet application program is connected to the card-side communications module and operable to receive Internet data from the computer and to send Internet data to the computer via the card-side communications module; and
 wherein the mobile device further comprises:
 instructions operable to initiate an Internet protocol connection to the computer; and
 instructions operable to determine that Internet data received from the computer is intended for the Universal Integrated Circuit Card and routing such Internet data intended for the Universal Integrated Circuit Card to the Universal Integrated Circuit Card;
 instructions operable to determine that Internet data received from the Universal Integrated Circuit Card is intended for the computer and routing such Internet data intended for the computer to the computer;
 wherein the computer further comprises:
 instructions operable to send Internet protocol data packets to the Universal Integrated Circuit Card and receive Internet data from the Universal Integrated Circuit Card on the Internet protocol connection in response to requests by the computer-side Internet application program via the mobile device.

17. The system for communication between a mobile device having a mobile device memory and a mobile device processor and a Universal Integrated Circuit Card having a Universal Integrated Circuit Card memory and a Universal Integrated Circuit Card processor of claim 16 wherein the computer further comprises a web proxy module for initiating a RAPI session to the mobile device and wherein the mobile device further comprises a TCP proxy operable to forward data received over the RAPI session to the Universal Integrated Circuit Card.

18. The system for communication between a mobile device having a mobile device memory and a mobile device processor and a Universal Integrated Circuit Card having a Universal Integrated Circuit Card memory and a Universal Integrated Circuit Card processor of claim 17 wherein the computer further comprises a routing table and wherein the web proxy is associated with a loop back address and wherein in the web proxy communicates with the TCP proxy on the mobile device, whereby any data packet addressed to the Universal Integrated Circuit Card address is automatically forwarded by the web proxy.

19. The system for communication between a mobile device having a mobile device memory and a mobile device processor and a Universal Integrated Circuit Card having a Universal Integrated Circuit Card memory and a Universal Integrated Circuit Card processor of claim 16 wherein the first application is a web browser and the second application is a web server.

20. The system for communication between a mobile device of claim 16 wherein the short range connection is selected from the set including selected from USB, Infrared connection, Bluetooth, and WiFi.

21. A mobile device operable to provide a mechanism for communication between a Universal Integrated Circuit Card having a Universal Integrated Circuit Card memory and a Universal Integrated Circuit Card processor and a remote server connected to a network via a mobile device having a mobile device memory and a mobile device, wherein the mobile device comprises:
 a mobile device communications module stored in the mobile device memory and having instructions to cause the mobile device processor to selectively communicate with the Universal Integrated Circuit Card processor or with at least one node on a network, the mobile device communications module having:
 an Internet protocol module operable to receive messages issued from a first Internet application as Internet protocol packets, and to transmit the packets to target IP addresses; and operable to receive Internet protocol packets, to process the packets, and to send the messages contained in the packets to the first Internet application and having:
 a routing module operable to receive Internet protocol packets and operable to cause the internet protocol module to transmit the packets selectively to the mobile device, to a GPRS network or to the Universal Integrated Circuit Card as a function of the target Internet protocol address of the packets;
 2. instructions to initiate an access session;
 3. instructions to, operable in response to a connected access session, to initiate a connection negotiation to create a connection between the mobile device and Universal Integrated Circuit Card wherein in the connection negotiation the Universal Integrated Circuit card assigns an IP address for the mobile device;

4. instructions to update an IP routing table such that incoming data packets intended for the Universal Integrated Circuit Card are routed to the Universal Integrated Circuit Card IP address;

wherein the first application is an application on a remote server; and wherein the mobile device further comprises means operable to connect to the Internet and to provide means by which the first application communicates with a second application executing on the Universal Integrated Circuit Card.

22. The mobile device operable to provide a mechanism for communication between a Universal Integrated Circuit Card having a Universal Integrated Circuit Card memory and a Universal Integrated Circuit Card processor and a remote server connected to a network via a mobile device having a mobile device memory and a mobile device, wherein the mobile device of claim 21, wherein the mobile device further provides Network Address Translation or further comprises a web proxy tunneling service.

23. The mobile device operable to provide a mechanism for communication between a Universal Integrated Circuit Card having a Universal Integrated Circuit Card memory and a Universal Integrated Circuit Card processor and a remote server connected to a network via a mobile device having a mobile device memory and a mobile device, wherein the mobile device of claim 22 wherein the Universal Integrated Circuit Card has a web client and wherein:

the web proxy is operable to tunnel a request from the web client in the Universal Integrated Circuit Card to the remote server;

the web proxy is operable to tunnel a response from the first remote server to the Universal Integrated Circuit Card; and the web proxy is operable to forward messages between the the web client and the first remote server.

24. The mobile device operable to provide a mechanism for communication between a Universal Integrated Circuit Card having a Universal Integrated Circuit Card memory and a Universal Integrated Circuit Card processor and a remote server connected to a network via a mobile device having a mobile device memory and a mobile device of claim 23, wherein the connection request from the web client to the remote server is the Connect method of the HTTP protocol.

25. The mobile device operable to provide a mechanism for communication between a Universal Integrated Circuit Card having a Universal Integrated Circuit Card memory and a Universal Integrated Circuit Card processor and a remote server connected to a network via a mobile device having a mobile device memory and a mobile device of claim 23, wherein the connection between the web client and the remote server is a secure connection.

26. A system for communication between a mobile device and a Universal Integrated Circuit Card, comprising:

the mobile device having a mobile device communication module selectively operable to communicate with the Universal Integrated Circuit Card and with nodes on a network using a network communications protocol; and the Universal Integrated Circuit Card having a Universal Integrated Circuit Card communications module operable to communicate with the mobile device communication module using the network communications protocol.

27. The system for communication between a mobile device and a Universal Integrated Circuit Card of claim 26, wherein the communications module further comprises:

an internet protocol module operable to receive messages issued from the first Internet application, to package the messages as Internet protocol packets, and to transmit the packets to the target IP addresses; and operable to receive Internet protocol packets, to process the packets, and to send the messages contained in the packets to the first Internet application and having:

a routing module operable to receive Internet protocol packets and operable to cause the internet protocol module to transmit the packets selectively to the mobile device, to a GPRS network or to the Universal Integrated Circuit Card as a function of the target Internet protocol address of the packets.

28. The system for communication between a mobile device and a Universal Integrated Circuit Card of claim 26, wherein the communications module and the Universal Integrated Circuit Card communications module each further comprises:

an upper level link layer module connected to the Universal Integrated Circuit Card link layer module and operable to carry higher level Internet protocols; and a Universal Integrated Circuit Card link layer module connected to a physical link to the Universal Integrated Circuit Card and operable to transmit data packets to the Universal Integrated Circuit Card and to receive data packets from the Universal Integrated Circuit Card.

29. The system for communication between a mobile device and a Universal Integrated Circuit Card of claim 28, wherein communication on the physical link is a half-duplex command and response protocol and wherein the upper level link layer module further comprises:

a full-to-half duplex communication module operable to enable the mobile device and the Universal Integrated Circuit Card to communicate using full-duplex Internet protocols over a half-duplex physical link communication protocol between the mobile device and the Universal Integrated Circuit Card is half-duplex.

30. The system for communication between a mobile device having a mobile device memory and a mobile device processor and a Universal Integrated Circuit Card having a Universal Integrated Circuit Card memory and a Universal Integrated Circuit Card processor of claim 1, wherein the wireless data network is a Generic Packet Radio Services network.

* * * * *